(12) United States Patent
Hoang et al.

(10) Patent No.: US 11,290,264 B2
(45) Date of Patent: Mar. 29, 2022

(54) SECURE AND EFFICIENT MULTI-SERVER OBLIVIOUS RANDOM ACCESS MACHINE IN A MALICIOUS EXECUTION ENVIRONMENT

(71) Applicant: Robert Bosch GmbH, Stuttgart (DE)

(72) Inventors: Thang Hoang, Corvallis, OR (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 16/675,705

(22) Filed: Nov. 6, 2019

(65) Prior Publication Data

US 2021/0135850 A1   May 6, 2021

(51) Int. Cl.
*H04L 9/08* (2006.01)
*H04L 9/00* (2022.01)
*G06F 17/16* (2006.01)

(52) U.S. Cl.
CPC .............. *H04L 9/085* (2013.01); *H04L 9/008* (2013.01); *G06F 17/16* (2013.01)

(58) Field of Classification Search
CPC .......... H04L 9/085; H04L 9/008; G06F 17/16
See application file for complete search history.

(56) References Cited

U.S. PATENT DOCUMENTS

| | | | |
|---|---|---|---|
| 10,229,068 B2 | 3/2019 | Wagh et al. | |
| 2017/0235969 A1* | 8/2017 | Kamara | H04L 63/0807 |
| | | | 713/159 |
| 2018/0158377 A1* | 6/2018 | Ikarashi | G09C 1/00 |
| 2018/0314847 A1* | 11/2018 | Yeo | H04L 9/085 |
| 2020/0201679 A1* | 6/2020 | Wentz | G06F 16/29 |

OTHER PUBLICATIONS

Abraham et al., Asymptotically Tight Bounds for Composing ORAM with PIR, 2017, International Association of Cryptologic Research, Second Ed, 92-96. (Year: 2017).*
Abraham et al. Asymptotically Tight Bounds of Composing, 2017, International Association for Cryptologic Research, pp. 1-30 (Year: 2017).*

(Continued)

*Primary Examiner* — Ashokkumar B Patel
*Assistant Examiner* — William B Jones
(74) *Attorney, Agent, or Firm* — Brooks Kushman P.C.

(57) ABSTRACT

An oblivious distributed file system is provided using an oblivious random access machine (ORAM), including an ORAM balanced tree structure, where each node in the tree is configured to store data blocks, the structure including at least two shares. The system also includes at least two ORAM servers, each of the servers configured to communicate with a client ORAM device, and programmed to facilitate storage of a different subset of the shares of the tree structure using a distributed file system and to implement an access procedure of a tree-based ORAM using the tree structure, including a retrieval phase and an eviction phase. In the retrieval phase, the servers utilize an authenticated Private Information Retrieval (PIR) protocol to retrieve data blocks as requested from the client ORAM device. In the eviction phase, the servers utilize a linear secret sharing scheme.

26 Claims, 17 Drawing Sheets

(56) References Cited

OTHER PUBLICATIONS

Abraham, Asymptotically Tight Bounds for Composing ORAM with PIR, IACR International Workshop on Public Key Cryptography, pp. 91-120, Springer, 2017.
Apon, Verifiable Oblivious Storage, International Workshop on Public Key Cryptography, pp. 131-148, Springer, 2014.
Bindschaedler, Practicing Oblivious Access on Cloud Storage: The Gap, the Fallacy, and the New Way Forward, Proceedings of the 22nd ACM SIGSAC Conference on Computer and Communications Security, pp. 837-849, ACM,. 2015.
Boyle, Recent Advances in Function & Homomorphic Secret Sharing (Invited Talk), Interdisciplinary Center Herzliya, Herzliya, Israel.
Chor, Private Information Retrieval, Journal of the ACM (JACM), 45(6):965-981, 1998.
Damgard, A Generalisation, a Simplification and Some Applications of Rainier's Probabilistic Public Key_System, International Workshop on Public Key Cryptography, pp. 119-136, Springer, 2001.
Damgard, Multiparty Computation From Somewhat Homomorphic Encryption, Advance in Cryptology—CRYPTO 2012, pp. 643-662, Springer, 2012.
Dautrich, Combining ORAM With PIR to Minimize Bandwidth Costs, Proceedings of the 5th ACM Conference on Data and Application Security and Privacy, pp. 289-296, ACM, 2015.
Devadas, Onion ORAM: A Constant Bandwidth Blowup Obliviouis Ram, Theory of Cryptography Conference, pp. 145-174, Springer, 2016.
Fletcher, Bucket ORAM: Single Online Roundtrip, Constant Bandwidth Oblivious Ram, Technical Report, IACR Cryptology ePrint Archive, 2015.
Gentry, Optimizing ORAM and Using It Efficiently for Secure Computation, International Symposium on Privacy Enhancing Technologies Symposium, pp. 1-18, Springer, 2013.
Gentry et al., Private Database Access With HE-over-ORAM Architecture, May 16, 2014.
Goldreich, Software Protection and Simulation on Oblivious Rams, Journal of the ACM (JACM), 43(3):431-473, 1996.
Goldreich, Towards a Theory of Software Protection and Simulation by Oblivious Rams, Proceedings of the 19th Annual ACM Symposium on Theory of Computing, pp. 182-194, ACM, 1987.
Hoang, Practical and Secure Dynamic Searchable Encryption Via Oblivious Access on Distributed Data Structure, Proceedings of the 32nd Annual Conference on Computer Security Applications, pp. 302-313, ACM, 2016.
Hoang, S3ORAM: A Computation-Efficient and Constant Client Bandwidth Blowup ORAM With Shamir Secret Sharing, Proceedings of the 2017 ACM Sigsac Conference on Computer and Communications Security, pp. 491-505, ACM, 2017.
Keller, Overdrive: Making SPDZ Great Again, Annual International Conference on the Theory and Applications of Cryptographic Techniques, pp. 158-189, Springer, 2018.
Mayberry, Efficient Private File Retrieval by Combining ORAM and PIR, NDSS, Citeseer, 2014.
Moataz, Constant Communication ORAM with Small Blocksize, Proceedings of the 22nd ACM SIGSAC Conference on Computer and Communications Security, pp. 862-873, ACM, 2015.
Naveed, The Fallacy of Composition of Oblivious Ram and Searchable Encryption, IACR Cryptology ePrint Archive, 2015:668, 2015.
Ostrovsky, Software Protection and Simulation on Oblivious RAMs, Journal of the ACM (JACM), 43(3):431-473, 1996.
Paillier, Public-Key Cryptosystems Based on Composite Degree Residuosity Classes, International Conference on the Theory and Applications of Cryptographic Techniques, pp. 223-238, Springer, 1999.
Pinkas, Oblivious RAM Revisited, Advances in Cryptology—CRYPTO 2010, pp. 502-519, Springer, 2010.
Ren, Ring ORAM: Closing the Gap Between Small and Large Client Storage Oblivious RAM, IACR Cryptology ePrint Archive, 2014:997, 2014.
Shi, Oblivious RAM With O((log N)3) Worst-Case Cost, Advances in Cryptology—ASIACRYPT 2011, pp. 197-214, Springer, 2011.
Stefanov, Multi-Cloud Oblivious Storage, Proceedings of the ACM SIGSAC Conference on Computer & Communications Security, pp. 247-258, ACM, 2013.
Stefanov, Path ORAM: An Extremely Simple Oblivious Ram Protocol, Proceedings of the ACM SIGSAC Conference on Computer and Communications Security, pp. 299-310, ACM, 2013.
Stefanov, Practical Dynamic Searchable Encryption With Small Leakage, NDSS, vol. 71, pp. 72-75,2014.
Stefanov, Towards Practical Oblivious Ram, arXiv:1106.3652, 2011.
Trostle, Efficient Computationally Private Information Retrieval From Anonymity or Trapdoor Groups, International Conference on Information Security, pp. 114-128, Springer, 2010.
Wang, Circuit ORAM: On Tightness of the Goldreich-Ostrovsky Lower Bound, Proceedings of the 22nd ACM SIGSAC Conference on Computer and Communications Security, pp. 850-861, ACM, 2015.

* cited by examiner $([T]_0, [T]_1, [T]_2) \leftarrow \text{ORAM}^{SS}_{XOR}.\text{Setup}(DB, T)$: Create a distributed $\text{ORAM}^{SS}_{XOR}$ structure for 3 servers:
1: Organize DB into $N$ blocks $(b_0, \ldots, b_{N-1})$ with corresponding identifiers $(bid_0, \ldots, bid_{N-1})$
2: $T[i,j] \leftarrow (0)^{|b|}$ for $1 \leq i < 2^{H+1}, 1 \leq j \leq Z$
3: for $i = 0, \ldots, N-1$ do
4:     $z_i \xleftarrow{\$} \{0, \ldots, 2^H - 1\}$
5:     Select $(x_i, y_i)$ such that $x_i \in \mathcal{P}(z_i)$ and $T[x_i, y_i]$ is empty
6:     $T[x_i, y_i] \leftarrow b_i$
7:     $T[x_i, y_i].\text{meta} \leftarrow (bid_i, z_i)$
8:     $pm[bid_i] \leftarrow z_i$
9: for $i = 0, \ldots, 2^{H+1} - 2$ do
10:     for $j = 0, \ldots, Z-1$ do
11:       $([T[i,j]]_0, [T[i,j]]_1, [T[i,j]]_2) \leftarrow SSS^{SPDZ}.\text{Create}(T[i,j], 3)$
12: return $([T]_0, [T]_1, [T]_2)$    ▷ Send $[T]_i, [T]_{i+1 \mod 3}$ to $S_i$, for $0 \leq i \leq 2$

FIG. 3

$b \leftarrow \text{ORAM}^{SS}_{XOR}.\text{Access}(op, bid, b^*)$:
1: $z \leftarrow pm[bid].pid$
2: $pm[bid].pid \xleftarrow{\$} \{0, \ldots, 2^H - 1\}$
3: $b \leftarrow \text{ORAM}^{SS}_{XOR}.\text{Retrieve}(bid, z)$
4: if $op = \text{write}$ then
5:     $b \leftarrow b^*$
6: $\text{ORAM}^{SS}_{XOR}.\text{Evict}(b)$
7: return $b$

FIG. 4

$b \leftarrow \text{ORAM}_{XOR}^{SS}.\text{Retrieve}(bid, pid)$
Client:
1: $n \leftarrow Z \cdot (H + 1)$
2: $([\text{meta}]_0, [\text{meta}]_1, [\text{meta}]_2) \leftarrow$ Get shares of meta-data components in path pid of $[T]_i$ from server $S_i$ for $0 \le i \le 2$
3: $\text{meta} \leftarrow SSS^{SPDZ}.\text{Recover}([\text{meta}]_0, [\text{meta}]_1, [\text{meta}]_2, 3)$
4: $z \leftarrow$ Get the index of bid in the path pid from meta
5: for $i = 0, \ldots, 2$ do
6: $\quad (e_i^{(0)}, e_i^{(1)}, e_i^{(0)}) \leftarrow PIR^{XOR}.\text{CreateQuery}(z, n, 2)$
7: Send $(pid, e_0^{(0)}, e_1^{(0)}, e_2^{(0)})$ to $S_0$, $(pid, e_1^{(1)}, e_2^{(1)}, e_0^{(1)})$ to $S_1$, $(pid, e_2^{(2)}, e_0^{(2)}, e_1^{(2)})$ to $S_2$.

Server: each $S_i \in \{S_0, \ldots, S_2\}$ receiving $(pid, e_i^{(i)}, e_{i+1 \pmod 3}^{(i)})$ do
7: $\quad [b^{(i)}]_i \leftarrow PIR^{XOR}.\text{Retrieve}(e_i^{(i)}, [T]_i, n)$, where $[T]_i \leftarrow$ Buckets $\mathcal{P}(pid)$ along the path pid in $[T]_i$
8: $\quad [b^{(i)}]_{i+1} \leftarrow PIR^{XOR}.\text{Retrieve}(e_{i+1}^{(i)}, [T]_{i+1}, n)$, where $[T]_{i+1} \leftarrow$ Buckets $\mathcal{P}(pid)$ along the path pid in $[T]_{i+1}$
9: Send $([b^{(i)}]_i, [b^{(i)}]_{i+1})$ to client

Client: On receive $\{[b^{(0)}]_0, [b^{(0)}]_1, [b^{(1)}]_1, [b^{(1)}]_2, [b^{(2)}]_2, [b^{(2)}]_0\}$ from 3 servers
9: for $i = 0, \ldots, 2$ do
10: $\quad [b]_i \leftarrow PIR^{XOR}.\text{Reconstruct}([b^{(0)}]_i, \ldots, [b^{(2)}]_i)$
11: $b \leftarrow SSS^{SPDZ}.\text{Recover}([b]_0, [b]_1, [b]_2, 3)$
12: $\text{meta} \leftarrow$ Move $(bid, pid)$ from its original position in meta-data to position $n_r$ ▷ $n_r$ initialized as 0 in setup phase
13: $([\text{meta}]_0, [\text{meta}]_1, [\text{meta}]_2) \leftarrow SSS^{SPDZ}.\text{Create}(\text{meta}, 3)$
14: Overwrite meta-data components in the path pid of $([T]_i, [T]_{i+1})$ with $([\text{meta}]_i, [\text{meta}]_{i+1})$, resp. in server $S_i$, for $0 \le i \le 2$
15: return $b$

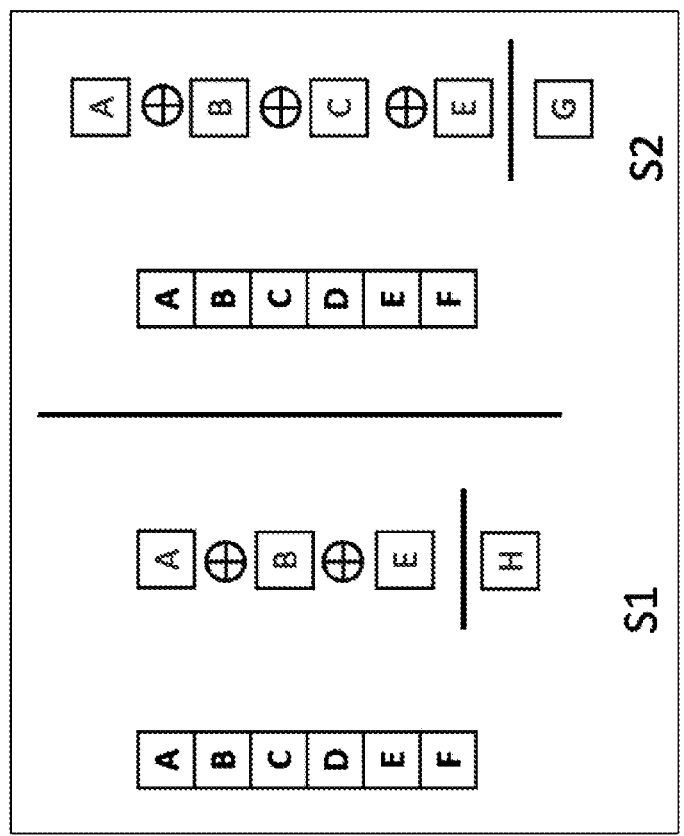
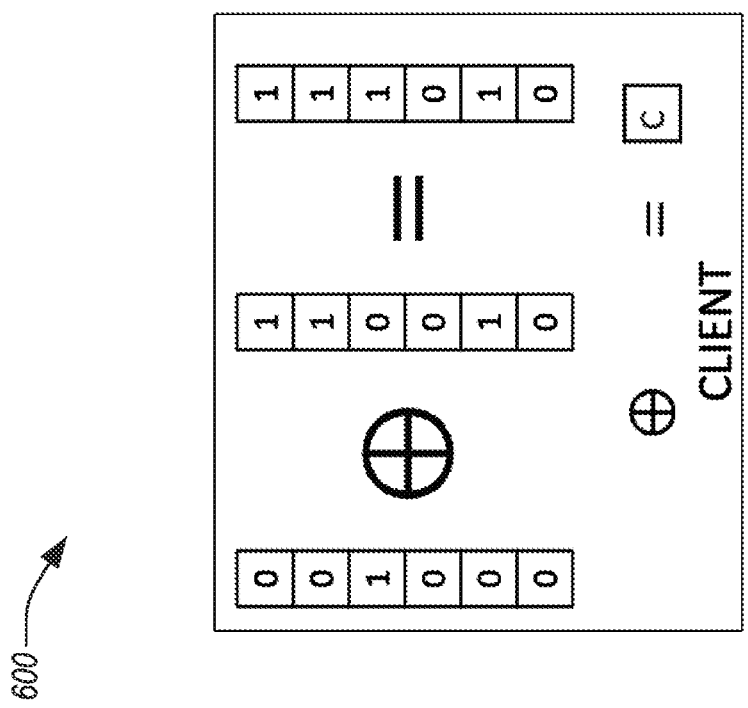
FIG. 6

```
ORAM_{XOR}^{SS}.Evict(b)
1: ([b]_0, [b]_1, [b]_2) ← SSS^{SPDZ}.Create(b_j, 3)
2: for i = 0, ..., 2 do
3:     Write [b]_i to slot [T[1, n_r]]_i in servers S_i and S_{i-1}
4: ([b]_0, [b]_1, [b]_2) ← SSS^{SPDZ}.Create(b_j, 3)
5: n_r ← n_r + 1 mod A                          ▷ n_r is initialized with 0 in setup phase
6: if n_r = 0 then
7:     Execute ORAM_{XOR}^{SS}.TripletEviction protocol
8:     n_e ← n_e + 1 mod 2^H                    ▷ n_e is initialized with 0 in setup phase
```

FIG. 10

$ORAM_{XOR}^{SS}$.TripletEviction

Client:
1: $v' \leftarrow \text{DigitReverse}_2(n_e \mod 2^H)$
2: $(\llbracket \text{meta} \rrbracket_0, \llbracket \text{meta} \rrbracket_1, \llbracket \text{meta} \rrbracket_2) \leftarrow$ Get meta-data shares of buckets and their sibling in path $v'$ of $\llbracket T \rrbracket_i$ from $S_i$ for $0 \leq i \leq 2$
3: meta $\leftarrow SSS^{SPDZ}.\text{Recover}(\llbracket \text{meta} \rrbracket_0, \llbracket \text{meta} \rrbracket_1, \llbracket \text{meta} \rrbracket_2; 3)$
4: for $h = 0, \ldots, H - 1$ do
5:     Create a $2Z \times Z$ matrix $I_h$, set $I_h[*, *] \leftarrow 0$
6:     for each real block with bid in bucket $\mathcal{P}(v, h)$ do
7:         Let $j$ be the index of bid in bucket $\mathcal{P}(v, h + 1)$
8:         $z' \leftarrow \text{pm}[\text{bid}].\text{pid}$
9:         if bucket $\mathcal{P}(v, h + 1) \in v'$ then
10:             Let $j'$ be the index of bid in bucket $\mathcal{P}(v, h + 1)$
11:             $I_h[j, Z + j'] \leftarrow 1$
12: Execute similar logics in steps 4–11 to generate $I_H$ for source-to-sibling permutation at leaf level.
13: $(\llbracket I_h \rrbracket_0, \llbracket I_h \rrbracket_1, \llbracket I_h \rrbracket_2) \leftarrow SSS^{SPDZ}.\text{Create}(I_h, 3)$ for $0 \leq h \leq H$
14: meta $\leftarrow$ Update the final positions of real blocks being moved
15: $(\llbracket \text{meta} \rrbracket_0, \llbracket \text{meta} \rrbracket_1, \llbracket \text{meta} \rrbracket_2) \leftarrow SSS^{SPDZ}.\text{Create}(\text{meta}, 3)$
16: Send $(v, \llbracket \text{meta} \rrbracket_i, \llbracket \text{meta} \rrbracket_{i+1}, (\llbracket I_0 \rrbracket_i, \ldots, \llbracket I_H \rrbracket_i))$ to $S_i$, for $0 \leq i \leq 2$

Server: each $S_i \in \{S_0, S_1, S_2\}$ receiving $(v, \llbracket \text{meta} \rrbracket_i, \llbracket \text{meta} \rrbracket_{i+1}, (\llbracket I_0 \rrbracket_i, \ldots, \llbracket I_H \rrbracket_i))$ do
19: Update meta-data components of buckets in path $v$ of $\llbracket T \rrbracket_i$ and $\llbracket T \rrbracket_{i+1}$ with $\llbracket \text{meta} \rrbracket_i$, $\llbracket \text{meta} \rrbracket_{i+1}$, resp.
20: for $h = 0, \ldots, H - 1$ do
21:     Copy data from source bucket $\mathcal{P}(v, h)$ to its *non-leaf* sibling bucket in $\llbracket T \rrbracket_i$
22:     $\llbracket b_v \rrbracket_i \leftarrow$ Buckets $\mathcal{P}(v, h)$ and $\mathcal{P}(v, h + 1)$ in $\llbracket T \rrbracket_i$
23:     $\llbracket b_h \rrbracket_i \leftarrow \llbracket b_h \rrbracket_i \cdot \llbracket I_h \rrbracket_i$     ▷ Invoke local addition and interactive secret-share multiplication
24: Execute similar logics in steps 22–23 for source-to-sibling permutation at leaf level.
25: Send buckets $\mathcal{P}(v)$ in $\llbracket T \rrbracket_i$ to $S_{i-1}$

*FIG. 10 (cont.)*

1400
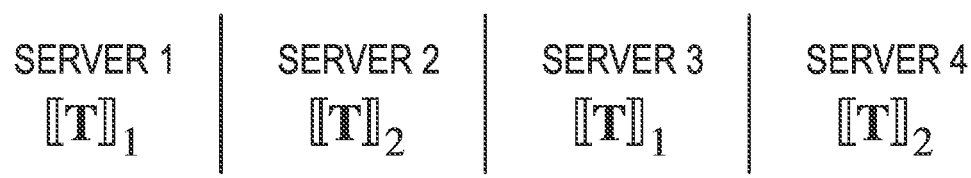
Four Server Approach
Three Server Approach
FIG. 14

US 11,290,264 B2

SECURE AND EFFICIENT MULTI-SERVER OBLIVIOUS RANDOM ACCESS MACHINE IN A MALICIOUS EXECUTION ENVIRONMENT

TECHNICAL FIELD

The present disclosure relates to aspects of a secure and efficient multi-server Oblivious Random Access Machine in a malicious execution environment.

BACKGROUND

Oblivious random access machines (ORAMs) enables a client to access data stored to the cloud without leaking access patterns to the cloud provider. Existing ORAM constructions either incur O(log N) client-server communication blowup, or O(1) blowup but with expensive homomorphic encryptions. To overcome these limitation, several multi-server ORAMs have been proposed, some of which offer O(1) client bandwidth blowup with efficient computation. Despite their merits, such distributed ORAM techniques only offer the security against semi-honest adversary. This assumption might not be practical for real-world applications where malicious adversaries may be present.

SUMMARY

In one or more illustrative examples, an oblivious distributed file system is provided using an oblivious random access machine (ORAM), including an ORAM balanced tree structure, where each node in the tree is configured to store data blocks, the structure including at least two shares. The system also includes at least two ORAM servers, each of the servers configured to communicate with a client ORAM device, and programmed to facilitate storage of a different subset of the shares of the tree structure using a distributed file system and to implement an access procedure of a tree-based ORAM using the tree structure, including a retrieval phase and an eviction phase. In the retrieval phase, the servers utilize an XOR-based Private Information Retrieval (PIR) protocol to retrieve data blocks as requested from the client ORAM device. In the eviction phase, the servers utilize a linear secret sharing scheme.

In one or more illustrative examples, a method for providing an oblivious distributed file system using an oblivious random access machine (ORAM) includes maintaining an ORAM balanced tree structure T, where each node in the tree T[i] is configured to store Z real data blocks, the structure T including three shares $[\![T]\!]_0$, $[\![T]\!]_1$, $[\![T]\!]_2$; utilizing first, second, and third ORAM servers ($S_0$, $S_1$, and $S_2$), each of the servers communicating with a client ORAM device, the servers facilitating storage of two of the shares of the tree structure including $[\![T]\!]_i$ and $[\![T]\!]_{i+1 (mod\ 3)}$ using a distributed file system and implementing an access procedure of a tree-based ORAM using the tree structure T including a retrieval phase and an eviction phase, wherein in the retrieval phase, utilizing by the servers an XOR-based Private Information Retrieval (PIR) protocol to retrieve data blocks Z as requested from the client ORAM device, and in the eviction phase, utilizing by the servers a homomorphic computation of linear secret sharing scheme.

In one or more illustrative examples, a non-transitory computer-readable medium includes instructions that, when executed by processors of at least two ORAM servers, each of the servers communicating with a client ORAM device, causes the servers to maintain an ORAM balanced tree structure, where each node in the tree is configured to store data blocks, the structure including at least two shares; and facilitate storage of a subset of the shares of the tree structure using a distributed file system and implementing an access procedure of a tree-based ORAM using the tree structure including a retrieval phase and an eviction phase, wherein in the retrieval phase, the servers use an XOR-based Private Information Retrieval (PIR) protocol to retrieve data blocks Z as requested from the client ORAM device, and in the eviction phase, the servers use a homomorphic computation of linear secret sharing scheme.

BRIEF DESCRIPTION OF THE DRAWINGS

FIG. 3 illustrates an example of a $ORAM_{XOR}^{SS}$ setup algorithm;

FIG. 4 illustrates an example of a $ORAM_{XOR}^{SS}$ access protocol;

FIG. 5 illustrates an example of a $ORAM_{XOR}^{SS}$ retrieval protocol;

FIG. 6 illustrates an example of the operation of an XOR-based PIR scheme;

FIG. 10 illustrates an example of a $ORAM_{XOR}^{SS}$ eviction protocol;

FIG. 14 illustrates an example of reducing the number of servers required to perform $ORAM_{XOR}^{SS}$ for a given privacy level;

DETAILED DESCRIPTION

Figure 1:
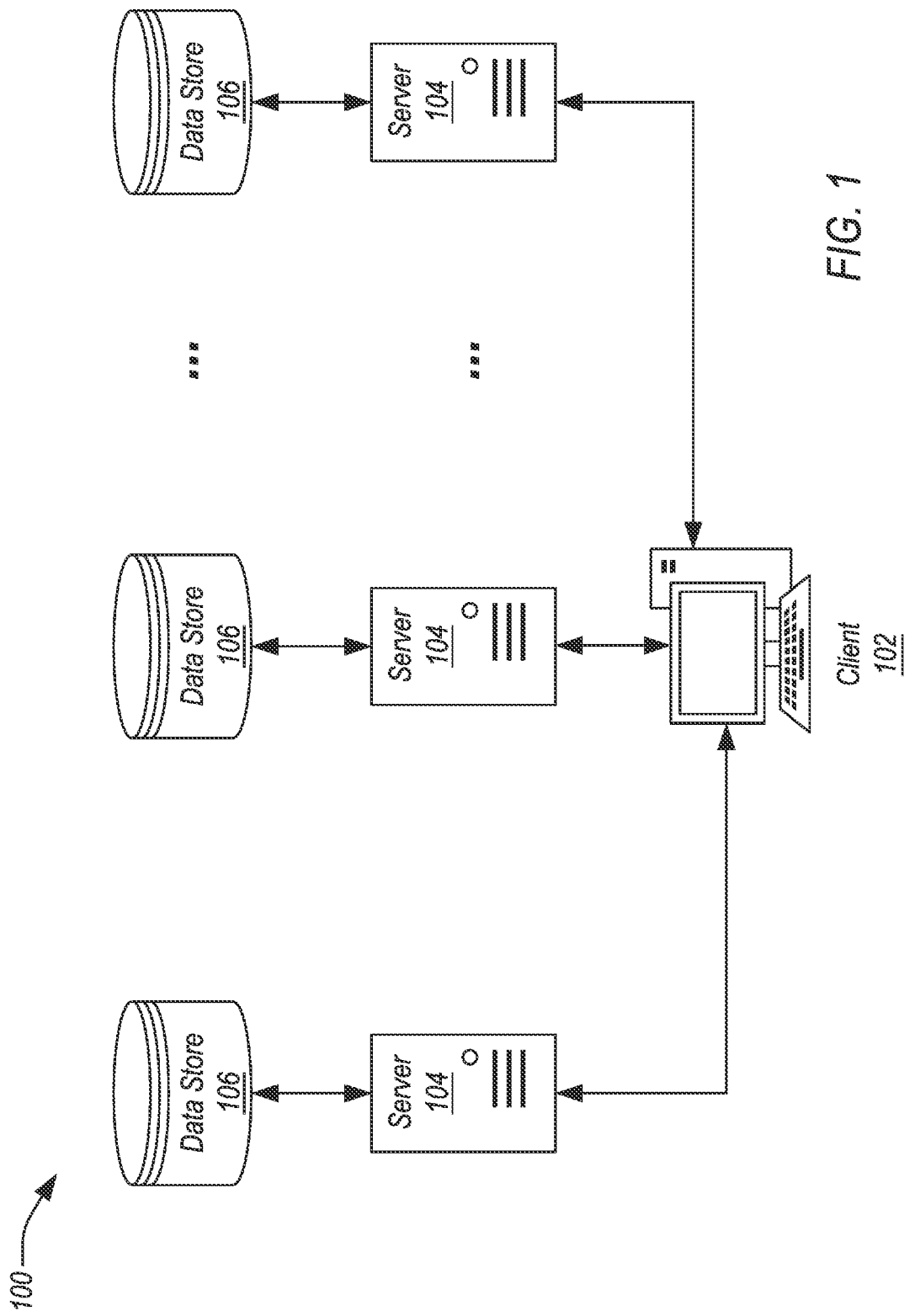
FIG. 1 illustrates an example system of a distributed $ORAM_{XOR}^{SS}$ for use in a distributed file system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. To achieve security in the presence of malicious adversary, aspects of the disclosure relate to harnessing authenticated private information retrieval techniques to implement the retrieval phase of the ORAM tree paradigm, and authenticated homomorphic matrix multiplication protocol in the shared setting to implement its eviction phase. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A new multi-server ORAM that achieves desirable efficiency properties as state-of-the-art distributed ORAM, along with a security guarantee against malicious adversaries is proposed. The discussed technique can be further used as a core cryptographic building block to construct efficient oblivious distributed file systems, which offer high level of data usability, security and privacy such as data availability, confidentiality, integrity and access pattern obliviousness.

Oblivious random access machines (ORAMs) allow clients to obfuscate access patterns when accessing personal data on the cloud. An example discussion of ORAMs may be found in Oded Goldreich and Rafail Ostrovsky. Software protection and simulation on oblivious rams, *Journal of the ACM (JACM)*, 43(3):431-473, 1996, which is incorporated herein by reference in its entirety. Despite recent progress, it has been shown that existing ORAM designs are costly due to their high communication and/or computation overhead. See, for example, the following publications which are incorporated herein by reference in their entireties: Ittai Abraham, Christopher W Fletcher, Kartik Nayak, Benny Pinkas, and Ling Ren. Asymptotically tight bounds for composing oram with pir, *IACR International Workshop on Public Key Cryptography*, pages 91-120. Springer, 2017; Vincent Bindschaedler, Muhammad Naveed, Xiaorui Pan, XiaoFeng Wang, and Yan Huang. Practicing oblivious access on cloud storage: the gap, the fallacy, and the new way forward, *Proceedings of the 22nd ACM SIGSAC Conference on Computer and Communications Security*, pages 837-849. ACM, 2015; Thang Hoang, Attila Altay Yavuz, and Jorge Guajardo. Practical and secure dynamic searchable encryption via oblivious access on distributed data structure, *Proceedings of the 32nd Annual Conference on Computer Security Applications*, pages 302-313. ACM, 2016; Tarik Moataz, Travis Mayberry, and Erik-Oliver Blass. Constant communication oram with small blocksize, *Proceedings of the 22nd ACM SIGSAC Conference on Computer and Communications Security*, pages 862-873. ACM, 2015; and Muhammad Naveed, The fallacy of composition of oblivious ram and searchable encryption, *IACR Cryptology ePrint Archive*, 2015:668, 2015. The following is a discussion of certain ORAM constructions as well as their limitations, followed by a description of a new and improved ORAM design addressing the limitations.

One type of ORAM is a passive ORAM (without server computation). ORAM was first introduced in the single-server setting with an established logarithmic communication lower-bound (i.e., (log N), where N is the number of data blocks) by Goldreich and Ostrovsky for any secure ORAM constructions (in Oded Goldreich, Towards a theory of software protection and simulation by oblivious rams, *Proceedings of the nineteenth annual ACM symposium on Theory of computing*, pages 182-194. ACM, 1987, which is incorporated herein by reference in its entirety). Preliminary ORAM designs (e.g., the aforementioned paper and also Oded Goldreich and Rafail Ostrovsky, Software protection and simulation on oblivious rams, *Journal of the ACM (JACM)* and Benny Pinkas and Tzachy Reinman. Oblivious ram revisited, *Advances in Cryptology—CRYPTO* 2010, pages 502-519. Springer, 2010, each of which is incorporated herein by reference in its entirety) are complicated and highly costly, whose asymptotic communication overhead does not meet the lower bound. In 2011, Shi et al. (in Elaine Shi, T-H Hubert Chan, Emil Stefanov, andMingfei Li. Oblivious ram with o ((log n) 3) worst-case cost, *Advances in Cryptology—ASIACRYPT* 2011, pages 197-214. Springer, 2011, which is incorporated herein by reference in its entirety) proposed a groundbreaking ORAM design, where the ORAM layout is organized as the tree structure. Since then, many efficient ORAM designs following the tree paradigm have been proposed, many of which have successfully achieved the lower bound communication overhead. Among these constructions, Path-ORAM by Stefanov et al. (in Emil Stefanov, Marten Van Dijk, Elaine Shi, Christopher Fletcher, Ling Ren, Xiangyao Yu, and Srinivas Devadas, Path ORAM: an extremely simple oblivious ram protocol. *Proceedings of the 2013 ACM SIGSAC conference on Computer and Communications security*, pages 299-310. ACM, 2013, which is incorporated herein by reference in its entirety) is the most simple and efficient single-server passive ORAM for data outsourcing, which achieves the optimal bound of O(log N) communication blowup under O(1) blocks of client storage. Despite its merits, Path-ORAM is still considered to be too costly for certain applications due to the transmission cost of O(log N) blocks per access request (as discussed in Vincent Bindschaedler, Muhammad Naveed, Xiaorui Pan, XiaoFeng Wang, and Yan Huang, Practicing oblivious access on cloud storage: the gap, the fallacy, and the new way forward, *Proceedings of the 22nd ACM SIGSAC Conference on Computer and Communications Security*, pages 837-849. ACM, 2015; Muhammad Naveed, The fallacy of composition of oblivious ram and searchable encryption, *IACR Cryptology ePrint Archive*, 2015:668, 2015; Emil Stefanov, Charalampos Papamanthou, and Elaine Shi, Practical dynamic searchable encryption with small leakage, *NDSS*, volume 71, pages 72-75, 2014, each of which is incorporated herein by reference in its entirety).

Another type of ORAM is a single-server active ORAM. To reduce the client communication blowup, researchers started to think of having an active server, where it can perform some certain computation. Early attempts (e.g., as described in Jonathan Dautrich and Chinya Ravishankar, Combining ORAM with PIR to minimize bandwidth costs, *Proceedings of the 5th ACM Conference on Data and Application Security and Privacy*, pages 289-296, ACM, 2015; Travis Mayberry, Erik-Oliver Blass, and Agnes Hui Chan, Efficient private file retrieval by combining ORAM and PIR, *NDSS*, Citeseer, 2014; and Ling Ren, Christopher-WFletcher, Albert Kwon, Emil Stefanov, Elaine Shi, Marten van Dijk, and Srinivas Devadas, Ring ORAM: Closing the gap between small and large client storage oblivious ram, *IACR Cryptology ePrint Archive*, 2014:997, 2014, each of which is incorporated herein by reference in its entirety) can only reduce the client bandwidth blowup by a constant using XOR trick or single-server Private Information Retrieval (PIR)-like techniques (e.g., Jonathan Trostle and Andy Parrish. Efficient computationally private information retrieval from anonymity or trapdoor groups, *International Conference on Information Security, pages* 114-128. Springer, 2010, which is incorporated herein by reference in its entirety). Hence, they still cannot surpass the logarithmic bandwidth barrier, some of which add up significant extra cost of single-server PIR computation to the overall delay.

Although some recent ORAM constructions have successfully achieved O(1) bandwidth blowup (e.g., Onion-ORAM as described in Srinivas Devadas, Marten van Dijk, ChristopherWFletcher, Ling Ren, Elaine Shi, and DanielWichs, Onion oram: A constant bandwidth blowup oblivious ram, *Theory of Cryptography Conference*, pages 145-174. Springer, 2016, which is incorporated herein by reference in its entirety, and in Bucket-ORAM as described in Christopher Fletcher, Muhammad Naveed, Ling Ren, Elaine Shi, and Emil Stefanov, Bucket oram: single online roundtrip, constant bandwidth oblivious ram, Technical report, *IACR Cryptology ePrint Archive*, Report 2015, 1065, 2015 and Daniel Apon, Jonathan Katz, Elaine Shi, and Aishwarya Thiruvengadam. Verifiable oblivious storage, *International Workshop on Public Key Cryptography*, pages 131-148, Springer, 2014, each of which is incorporated herein by reference in its entirety), they rely on costly cryptographic primitives such as partial/fully homomorphic encryption (HE) (e.g., Pascal Paillier, Public-key cryptosystems based on composite degree residuosity classes, *International Conference on the Theory and Applications of Cryptographic Techniques*, pages 223-238. Springer, 1999, which is incorporated herein by reference in its entirety). It has been experimentally shown that such HE operations take much longer execution time than just simply streaming O(log N) blocks even with the slow network setting (as shown in Ittai Abraham, Christopher W Fletcher, Kartik Nayak, Benny Pinkas, and Ling Ren, asymptotically tight bounds for composing oram with pir, IACR InternationalWorkshop on Public Key Cryptography, pages 91-120. Springer, 2017, and Thang Hoang, Ceyhun D Ozkaptan, Attila A Yavuz, Jorge Guajardo, and Tam Nguyen. $S_3$oram: A computation efficient and constant client bandwidth blowup oram with shamir secret sharing, *Proceedings of the 2017 ACM SIGSAC Conference on Computer and Communications Security*, pages 491-505. ACM, 2017, each of which is incorporated herein by reference in its entirety).

Another type of ORAM is the multi-server active ORAM. To avoid costly cryptographic operations, the recent research line focuses on developing ORAM protocol in the distributed setting. Stefanov et al. (in Emil Stefanov and Elaine Shi. Multi-cloud oblivious storage, *Proceedings of the 2013 ACM SIGSAC conference on Computer & communications security*, pages 247-258. ACM, 2013, which is incorporated herein by reference in its entirety) proposed a two-server ORAM protocol, which achieves O(1) client-server bandwidth blowup with O(log N) server-server communication. However, this protocol may not be suitable for memory-limited clients (e.g., mobile) because it follows the Partition-ORAM design principle requiring O(sqrt(N)) blocks of client storage (as discussed in Emil Stefanov, Elaine Shi, and Dawn Song. Towards practical oblivious ram. arXiv preprint arXiv:1106.3652, 2011, which is incorporated herein by reference in its entirety). Abraham et al. (in Ittai Abraham, Christopher W Fletcher, Kartik Nayak, Benny Pinkas, and Ling Ren. Asymptotically tight bounds for composing oram with pir, *IACR International Workshop on Public Key Cryptography*, pages 91-120. Springer, 2017, which is incorporated herein by reference in its entirety) proposed a distributed ORAM using XOR-based PIR (e.g., as discussed in Benny Chor, Eyal Kushilevitz, Oded Goldreich, and Madhu Sudan, Private information retrieval, *Journal of the ACM (JACM)*, 45(6):965-981, 1998, which is incorporated herein by reference in its entirety) and also indicated that, there exists a sub-logarithmic communication blowup bound of (log cD N) for ORAM-PIR composition, where c, D are the numbers of blocks stored by the client and performed by PIR operations, respectively. Very recently, Hoang et al. proposed $S^3$ORAM (in Thang Hoang, Ceyhun D Ozkaptan, Attila A Yavuz, Jorge Guajardo, and Tam Nguyen, $S^3$ORAM: A computation efficient and constant client bandwidth blowup oram with shamir secret sharing, *Proceedings of the 2017 ACM SIGSAC Conference on Computer and Communications Security*, pages 491-505. ACM, 2017, which is incorporated herein by reference in its entirety) a three-server ORAM scheme based on multi-party computation, which offers desirable performance properties such as O(1) client bandwidth blowup, O(1) block storage, and low computation overhead at both client and server sides. Despite its efficiency merits, the main limitation of $S^3$ORAM is that it only offers the security guarantee given that all the servers follow the protocol faithfully. This assumption may not be suitable in the practical execution environment, where the malicious adversaries might present. Due to its fundamental building blocks, $S^3$ORAM cannot detect malicious behaviors that can compromise the access pattern privacy with an overwhelming probability.

In this disclosure, a new distributed ORAM is described, along with its application to the implementation of a distributed file systems. The proposed system is based on a novel composition of multi-server Private Information Retrieval and Linear Secret Sharing. Therefore, the proposed system provides strong protection for customer privacy even in the presence of a malicious adversary. In addition, the system allows not only for oblivious storage but also, in some implementations, for computation on the data while obliviously stored.

In ORAM, there are two common procedures, retrieval and eviction. Retrieval is used to privately retrieve the block/file of interest, while eviction is used to write the retrieved block back to the storage server. Both of these procedures should be performed in an oblivious manner.

A new distributed ORAM may be designed (referred to herein as $ORAM_{XOR}^{SS}$), in which the retrieval and eviction procedures are implemented as follows. For the retrieval phase, XOR-based PIR (as mentioned above) may be utilized. This technique allows retrieval of the data block of interest in a private manner, but also can detect malicious behaviors attempting to compromise the user access pattern privacy. For the eviction phase, the ORAM scheme harnesses homomorphic properties of linear secret sharing scheme (e.g., SPDZ as discussed in Ivan Damgård, Valerio Pastro, Nigel Smart, and Sarah Zakarias, Multiparty computation from somewhat homomorphic encryption, *Advances in Cryptology—CRYPTO* 2012, pages 643-662. Springer, 2012, and Marcel Keller, Valerio Pastro, and Dragos Rotaru. Overdrive: making spdz great again. *Annual International Conference on the Theory and Applications of Cryptographic Techniques*, pages 158-189. Springer, 2018, each of which is incorporated herein by reference in its entirety). This allows secure computation in the eviction phase that can be performed in a much more computation- and communication-efficient manner via an online-offline model with an optimal privacy level.

As discussed in detail herein, the $ORAM_{XOR}^{SS}$ utilizes two or more servers for such composition. Moreover, the $ORAM_{XOR}^{SS}$ offers many desirable properties. First, $ORAM_{XOR}^{SS}$ is secure in the presence of malicious adversaries. $ORAM_{XOR}^{SS}$ offers information-theoretic security for the outsourced data and user access pattern in the presence of malicious adversaries. Any attempt to tamper with the database/query to compromise the access pattern privacy will be detected. Second, $ORAM_{XOR}^{SS}$ offers low computation overhead at both client and server sides. In the online phase, servers only perform computations including XOR, modular additions and multiplications. This is much more efficient than other active ORAM schemes requiring computation at the server side (e.g., partial HE as discussed in Ivan Damgård and Mads Jurik, A generalisation, a simplification and some applications of paillier's probabilistic public-key system, *International Workshop on Public Key Cryptography*, pages 119-136. Springer, 2001, which is incorporated herein by reference in its entirety). On the other hand, the client in ORAM$_{XOR}^{SS}$ only performs one XOR and two modular addition operations per accessed block. This is also more efficient than many ORAM schemes, which incur a number of partial HE operations. Third, ORAM$_{XOR}^{SS}$ provides for constant client storage and bandwidth blowup. ORAM$_{XOR}^{SS}$ offers O(1) client-bandwidth blowup, compared with O(log N) of the most efficient single-server communication-only ORAM schemes with a fixed number of servers (e.g., as discussed in Ling Ren, Christopher W Fletcher, Albert Kwon, Emil Stefanov, Elaine Shi, Marten van Dijk, and Srinivas Devadas, Ring oram: Closing the gap between small and large client storage oblivious ram, *IACR Cryptology ePrint Archive*, 2014:997, 2014, and Emil Stefanov, Marten Van Dijk, Elaine Shi, Christopher Fletcher, Ling Ren, Xiangyao Yu, and Srinivas Devadas, Path oram: an extremely simple oblivious ram protocol, *Proceedings of the 2013 ACM SIGSAC conference on Computer and Communications security*, pages 299-310. ACM, 2013, each of which is incorporated herein by reference in its entirety). Moreover, ORAM$_{XOR}^{SS}$ features smaller block size than other ORAM schemes that achieves the same constant bandwidth blowup (e.g., Onion-ORAM, and Bucket-ORAM mentioned above). Fourth, ORAM$_{XOR}^{SS}$ enjoys extremely low end-to-end delay. Due to highly efficient computation at both client and server sides along with constant client-bandwidth blowup, ORAM$_{XOR}^{SS}$ achieves extremely low end-to-end delay.

FIG. 1 illustrates an example system 100 of a distributed ORAM$_{XOR}^{SS}$ for use in a distributed file system. As shown, the system 100 includes a client 102 and three servers 104 (which may be referred to as $S_0$, $S_1$, and $S_2$). Each server 104 maintains one or more data stores 106 including the information to be stored and retrieved. (It should be noted that in other examples, more servers 104, clients 102, and data stores 106 may be included.) For sake of discussion, it is assumed that the channels (illustrated as arrows) between all the elements of the system 100 are pairwise-secure, i.e., no player can tamper, read, or modify the contents of the communication channel of other elements.

Each of the client 102 and server 104 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, JavaScript, Perl, PL/SPL, etc.

With respect to security, in the system 100 only the client 102 is deemed trustworthy. All servers 104 can behave in a malicious manner, in which they can tamper with the input data to learn the access pattern of the client 102. A security model of multi-server ORAM may therefore be defined (e.g., as in S³ORAM) as follows:

Let x=((op$_0$, bid$_0$, data$_0$), . . . , (op$_{q-1}$, bid$_{q-1}$, data$_{q-1}$)) be a data request sequence of length q, where:

op$_j \in$ {Read, Write}, bid$_j$ is the block identifier to be read or written; and data$_j$ is the data identified by bid$_j$ to be read or written.

Assume there are l servers S={$S_0$, . . . , $S_{l-1}$} in the system 100.

Regarding correctness, let ORAM$_i$(x) represent a sequence of interactions from the ORAM client 102 to the server $S_i$, given a data request sequence x.

A multi-server ORAM is correct if, for any access sequence x: {ORAM$_1$(x), . . . , ORAM$_l$(x)} returns data consistent with x except with a negligible probability.

Regarding t-security. A multi-server ORAM is t-secure if $\forall \mathcal{I} \subseteq \{0, \ldots \ell-1\}$ such that:

$|\mathcal{I}| \le t$ for any two data access sequences x, y, with |x|=|y|, and where their corresponding transcripts $ORAM_{i \in \mathcal{I}}(x)\}$ and $\{ORAM_{i \in \mathcal{I}}(y)\}$ observed by a coalition of up to t servers $\mathcal{S}_{i \in \mathcal{I}}\}$ are statistically or computationally indistinguishable.

Figure 2:
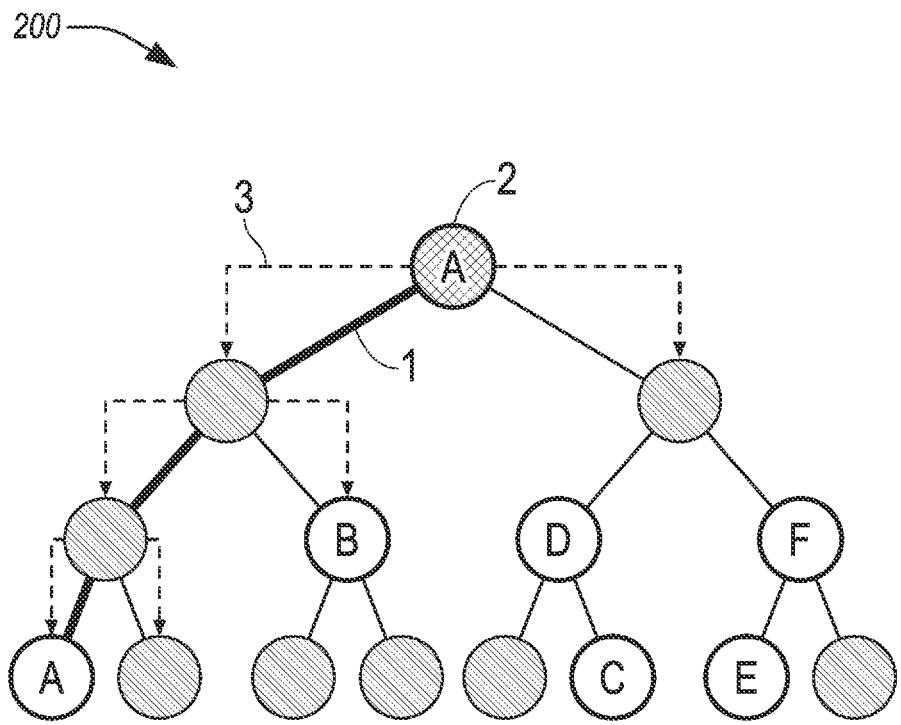
FIG. 2 illustrates an example of a $ORAM_{XOR}^{SS}$ data structure.

FIG. 2 illustrates an example 200 of an ORAM$_{XOR}^{SS}$ data structure. The ORAM$_{XOR}^{SS}$ data structure may be described in terms of the Onion-ORAM layout design discussed above; however, the methodology can be applied atop other tree-based ORAM layouts as outlined below (e.g., see Circuit-ORAM as described in XiaoWang, Hubert Chan, and Elaine Shi. Circuit oram: On tightness of the goldreich-ostrovsky lower bound, *Proceedings of the 22nd ACM SIGSAC Conference on Computer and Communications Security*, pages 850-861. ACM, 2015, which is incorporated herein by reference in its entirety). Basically, the ORAM$_{XOR}^{SS}$ structure may be defined as a balanced tree denoted as T with a height of H. Each node in the tree may be denoted as T[i], where $0 \le i < 2^{H+1} \le 1$) and may be referred to as a bucket. Each bucket may store Z real data blocks, which may be accessed as T[i, j] where $0 \le j < Z$. Each node has a meta-data component that stores the path and position information of real blocks among the Z slots. Unless otherwise stated, bucket is meant to only imply the data block stored in it, and this disclosure will be explicit about mention of the meta-data component if that data is intended. The ORAM$_{XOR}^{SS}$ structure can store at most $N \le A \cdot 2^{H-1}$ data blocks, where A is a constant number. Similar to other tree-based ORAM constructions, ORAM$_{XOR}^{SS}$ has a position map component pm:=(bid, pid), where $0 \le pid < 2^H$, to store the path information of data blocks in T. This component can be stored recursively in smaller ORAM trees as proposed with respect to Path-ORAM mentioned above.

FIG. 3 illustrates an example 300 of a ORAM$_{XOR}^{SS}$ setup algorithm. Thus, construction of the ORAM$_{XOR}^{SS}$ data structure may be done in accordance with the operations outlined in the example 300. It should be noted that this is one example, and other example implementations may additionally or alternately be used.

Given a database DB consisting of N data blocks $b_i$, each being of size B-bit, the ORAM$_{XOR}^{SS}$ setup algorithm creates shares of T as the output for l servers as follows. First, the client 102 initializes every slot in each bucket of T with a 0's string of length B (step 2). Then, the client 102 organizes all database blocks into T, wherein each $b_i$ is independently assigned to a random leaf bucket of T. The client 102 then creates shares of T by executing the SSS$^{SPDZ}$: Create Algorithm for every block in T (steps 9-11).

For simplicity and ease of understanding, it can be assumed that $|b|\leq \lfloor \log_2 p \rfloor$. In case $|b|>\lfloor \log_2 p \rfloor$, the client splits each block into equal-sized chunks $c_j$ such that $c_j \in \mathbb{F}_p$.

The ORAM$_{XOR}^{SS}$ system model may, e.g., use three servers $S=(S_0, S_1, S_2)$. Hence, the distributed ORAM$_{XOR}^{SS}$ structure consists of three shares of T as $\{[\![T]\!]_0, [\![T]\!]_1, [\![T]\!]_2\}$. In ORAM$_{XOR}^{SS}$, each server $S_i$ stores two shares of the tree including $[\![T]\!]_i$ and $[\![T]\!]_{i+1(mod\ 3)}$.

FIG. 4 illustrates an example 400 of a ORAM$_{XOR}^{SS}$ access protocol. It should be noted that this is one example, and other example implementations may additionally or alternately be used. As shown, the ORAM$_{XOR}^{SS}$ follows the generic access procedure of tree-based ORAMs (discussed above), which contains two subroutines: retrieval and eviction. Generally speaking, for each block to be accessed, the client retrieves its path from a position map (pm) and assigns it to a new path selected uniformly at random. The client then executes the retrieval protocol on the former path of accessed block to read the block to local memory (step 3). The retrieval process is described in further detail with respect to FIG. 4. After that, the client updates the block and then executes the eviction protocol to write the block from the local memory to the ORAM-tree structure (step 6). The eviction process is described in further detail with respect to FIG. 7. Intuitively, ORAM$_{XOR}^{SS}$ leverages XOR-based multi-server PIR and homomorphic properties of SPDZ secret sharing to implement the retrieval and eviction protocols, respectively.

Referring back to FIG. 2, as further shown these three operations may be performed to the ORAM$_{XOR}^{SS}$ data structure are shown. These include the operation to read a data block from the tree, the operation to write an accessed block back to the tree at the root, and the operation to evict data blocks from the tree.

FIG. 5 illustrates an example 500 of a ORAM$_{XOR}^{SS}$ retrieval protocol. The example 500 ORAM$_{XOR}^{SS}$ retrieval protocol employs three algorithms of the XOR-based PIR scheme. It should be noted that this is one example, and other example implementations may additionally or alternately be used.

FIG. 6 illustrates an example 600 of the operation of an XOR-based PIR scheme. As shown, each server 104 stores a replica of a database. During operation, the client 102 (i) creates a select query for a block of data, (ii) creates n−1 random binary strings, (iii) XORs the n−1 random strings with the select query, (iv) distributes the strings to corresponding server 104, and (v) XORs the replies to obtain back the block. Each corresponding server 104 (here noted as $S_1$ and $S_2$ for example), (i) XORs database items corresponding with 1-valued element in the string, and (ii) sends a result of the operation back to the client 102.

Referring back to FIG. 5, and with continuing reference to FIG. 6, given a block with its identifier (bid) and path (pid) to be accessed, the client downloads the shares of meta data components of buckets along pid from three servers (step 2). The client reconstructs the meta data to retrieve the location of bid, and then computes the index (z) of bid in the path. (steps 3-4). After that, the client generates six queries by executing the PIR:CreateQuery algorithm three times, each generating two queries $(e_i^{(0)}, e_i^{(1)})$ for one share of the ORAM tree. (steps 5-6). In this case, the client interprets buckets along the retrieval path as the database input in the XOR-based PIR protocol. Hence, the database size and the length of the query vector is n=Z·(H+1). Next, the client 102 sends two queries $(e_i, e_{i+1})$ to each server $S_i$, for $0 \leq i \leq 2$. Each server $S_i$ executes the PIR:CreateQuery algorithm on each input $e_i$ and $e_{i+1}$ respectively, with its corresponding share $[\![T]\!]_i$ and $[\![T]\!]_{i+1}$ respectively, formed by concatenating buckets along pid in the ORAM tree $[\![T]\!]_i$ and $[\![T]\!]_{i+1}$ respectively, (steps 7-8) and sends the computed values to the client 102. Finally, the client recovers the shares of the retrieved block by executing PIR:Reconstruct algorithm (steps 9-10), and then reconstructs the block by invoking the SSS$^{SPDZ}$:Recover algorithm over three recovered shares (step 11).

Figure 7:
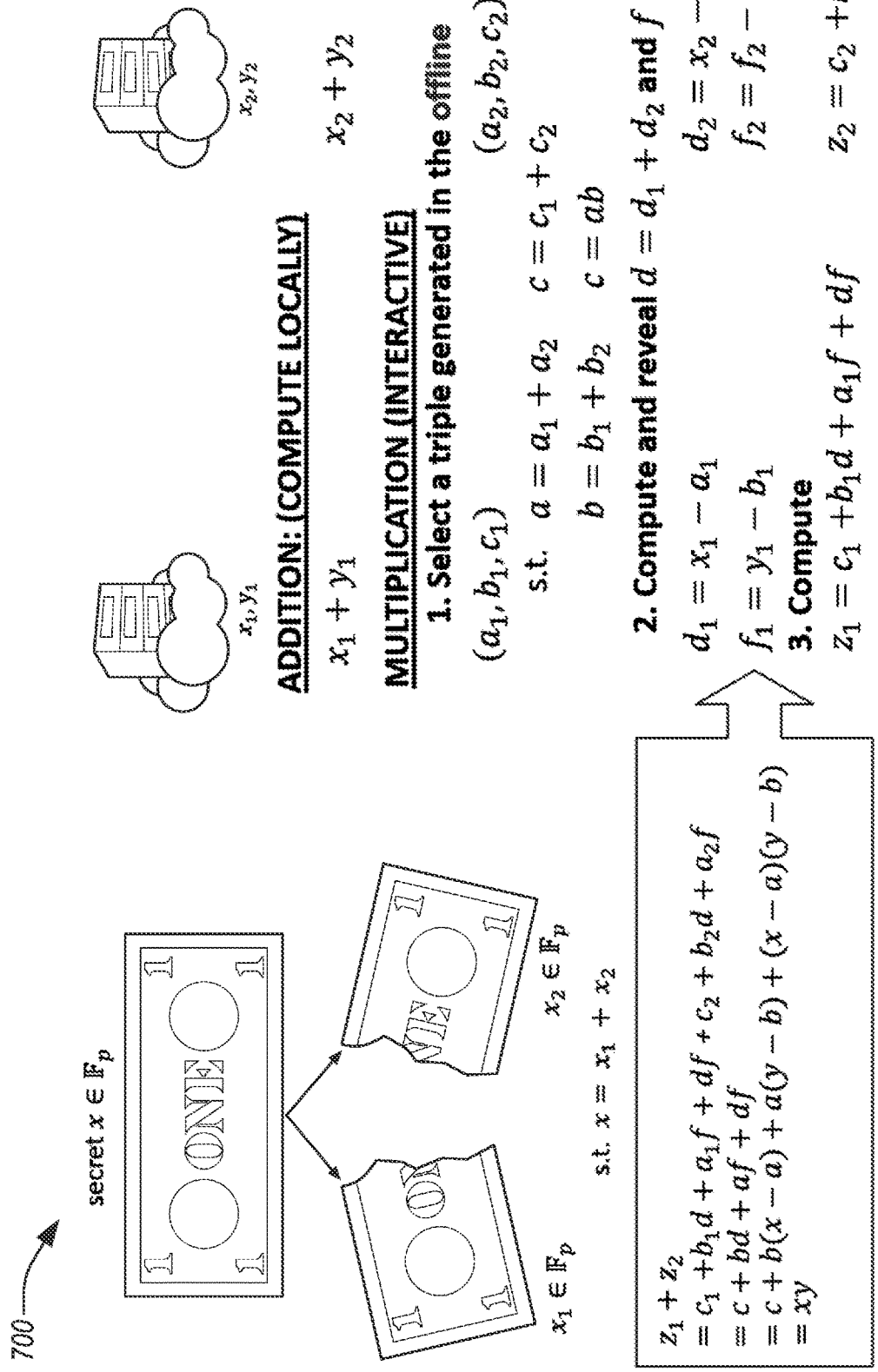
FIG. 7 illustrates an example of further details of SPDZ secret sharing.

FIG. 7 illustrates an example 700 of further details of SPDZ secret sharing. In general, a secret x may be defined such that $x \in \mathbb{F}_p$, and $x_1 \in \mathbb{F}_p$, $x_2 \in \mathbb{F}_p$, such that $x=x_1+x_2$. Moreover, a first server may store $x_1$ and $y_1$, while a second server may store $x_2$ and $y_2$. The sum $x_1+y_1$ may be computed locally by the first server, while the sum $x_2+y_2$ may be computed locally by the second server. Moreover, the first server may generate a first triple $(a_1, b_1, c_1)$ and the second sever may generate a second triple $(a_2, b_2, c_2)$ such that $a=a_1+a_2$, $b=b_1+b_2$, $c=c_1+c_2$ and $c=ab$. Then, it may be computed and revealed that $d=d_1+d_2$ and $f=f_1+f_2$, where:

$$d_1 = x_1 - a_1,$$

$$d_2 = x_2 - a_2,$$

$$f_1 = y_1 - b_1, \text{ and}$$

$$f_2 = y_2 - b_2.$$

Moreover:

$$z_1 + z_2 =$$
$$= c_1 + b_1 d + a_1 f + df + c_2 + b_2 d + a_2 f$$
$$= c + bd + af + df$$
$$= c + b(x-a) + a(y-b) + (x-a)(y-b)$$
$$= xy$$

Accordingly, it can be computed that:

$$z_1 = c_1 + b_i d + a_i f + df, \text{ and}$$

$$z_2 = c_2 + b_2 d + a_2 f.$$

Figure 8:
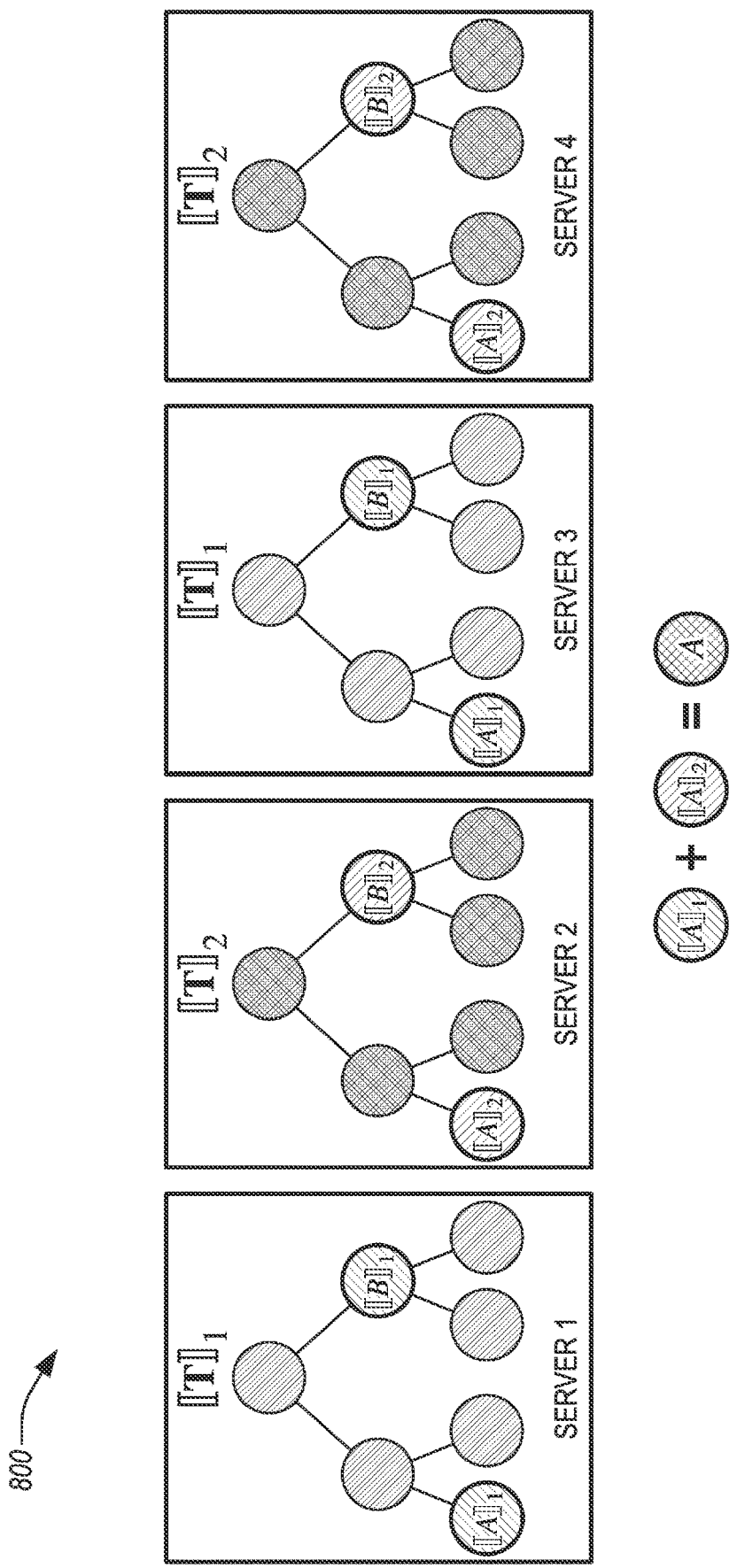
FIG. 8 illustrates an example 800 of the $ORAM_{XOR}^{SS}$ read phase.

FIG. 8 illustrates an example 800 of the ORAM$_{XOR}^{SS}$ read phase. As shown, XOR-PIR is performed to obtain each share of SPDZ. These shares are shown as $[\![A]\!]_1$ and $[\![A]\!]_2$. Then, the secret may be recovered from the SPDZ shares. As shown, the shares $[\![A]\!]_1$ and $[\![A]\!]_2$ may be summed to retrieve the shared secret A.

Figure 9:
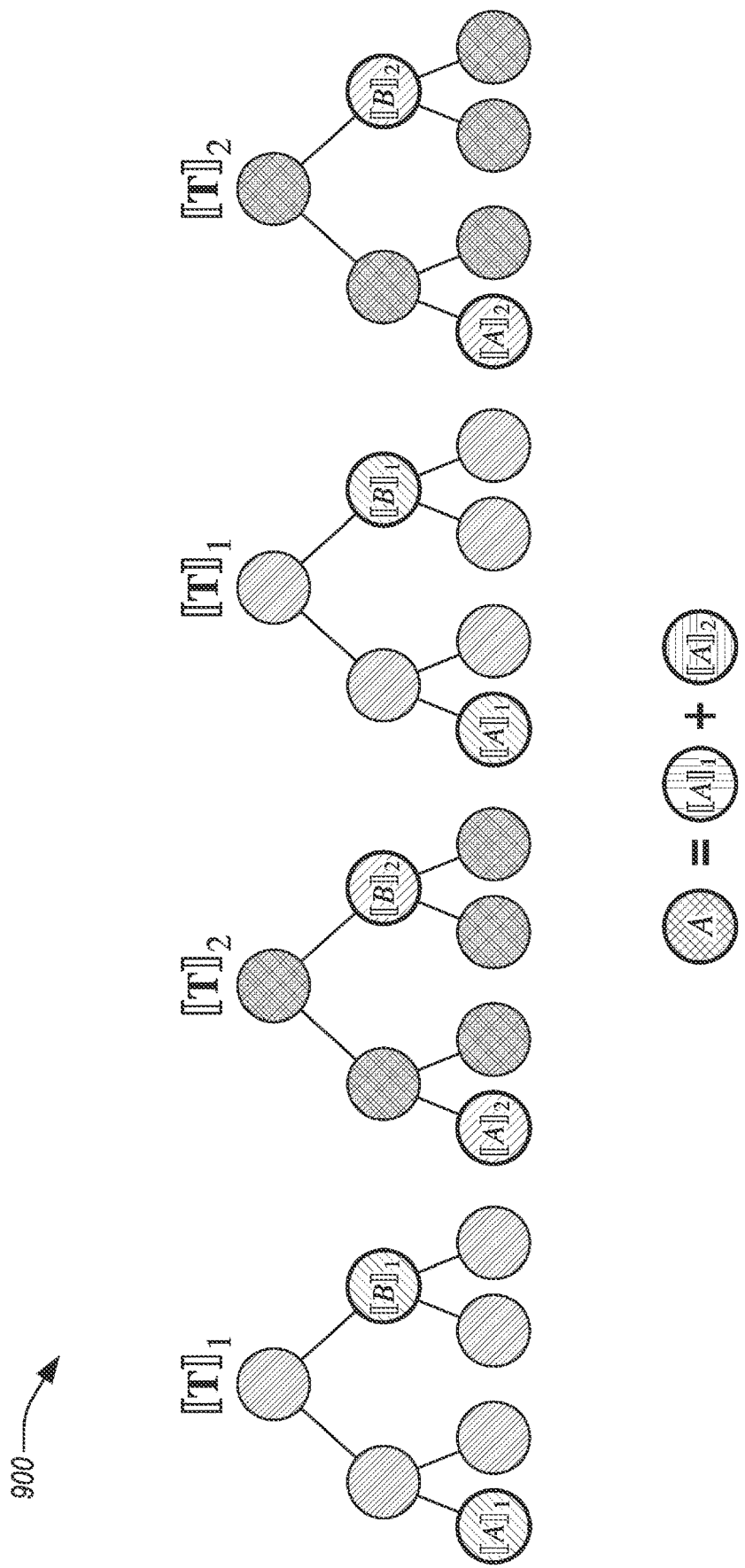
FIG. 9 illustrates an example 900 of the $ORAM_{XOR}^{SS}$ write phase.

FIG. 9 illustrates an example 900 of the ORAM$_{XOR}^{SS}$ write phase. As shown, the secret is reshared from A to $[\![A]\!]_1$ and $[\![A]\!]_2$. Next, the shares are rewritten to the root of the corresponding servers.

FIG. 10 illustrates an example 700 of a ORAM$_{XOR}^{SS}$ eviction protocol. As shown in the illustrated example, ORAM$_{XOR}^{SS}$ follows the triplet eviction principle in Onion-ORAM design, and secret sharing homomorphic permutation proposed in S$^3$ORAM. In general, after the block is retrieved and updated, the client 102 creates its shares with SPDZ, and then writes the share to an empty slot in the root bucket of ORAM structure. After A successive retrievals, the triplet eviction is performed on a deterministic eviction path following the reverse lexicographical order (e.g., as proposed in Craig Gentry, Kenny A Goldman, Shai Halevi, Charanjit Julta, Mariana Raykova, and DanielWichs. Optimizing ORAM and using it efficiently for secure computation, *International Symposium on Privacy Enhancing Technologies Symposium*, pages 1-18. Springer, 2013, which is incorporated herein by reference in its entirety).

There are three buckets involved in a triplet relationship: (i) a source bucket, where its data is moved to its children; (ii) a destination bucket, which is the source bucket's child that resides in the eviction path; and (iii) a sibling bucket, which is the other child. The operation is as follows.

With respect to source-to-destination, let ⟦u⟧ be a 2Z-dimensional share vector formed by c⟦u⟧ catenating the data in the source bucket and the destination bucket. Shares of the permutation matrix may be created as similar to $S^3$ORAM to obliviously move the element at index i to position j in—via homomorphic addition and multiplication of SPDZ secret sharing.

With respect to source-to-sibling, according to the triplet eviction principle, non-leaf sibling buckets are guaranteed to be empty due to the previous evictions, each featuring a negligible bucket overflow probability. Hence, the servers 104 only copy all data from the source bucket to sibling bucket at these levels. At the leaf level, since leaf buckets are not empty, the matrix permutation principle may be used to obliviously move data from source buckets to sibling buckets as in the source-to-destination case.

Notice that in the described system 100, each server 104 stores one replica of the tree-ORAM share from the other server beyond its own share; thus, it is required to ensure that all replicates are consistent for XOR-based multi-server PIR protocol. Therefore, once the eviction protocol is finished, the server $S_i$ will send its own tree-ORAM share ⟦T⟧$_i$ to server $S_{i-1}$ to maintain the consistency between replicas.

Figure 11:
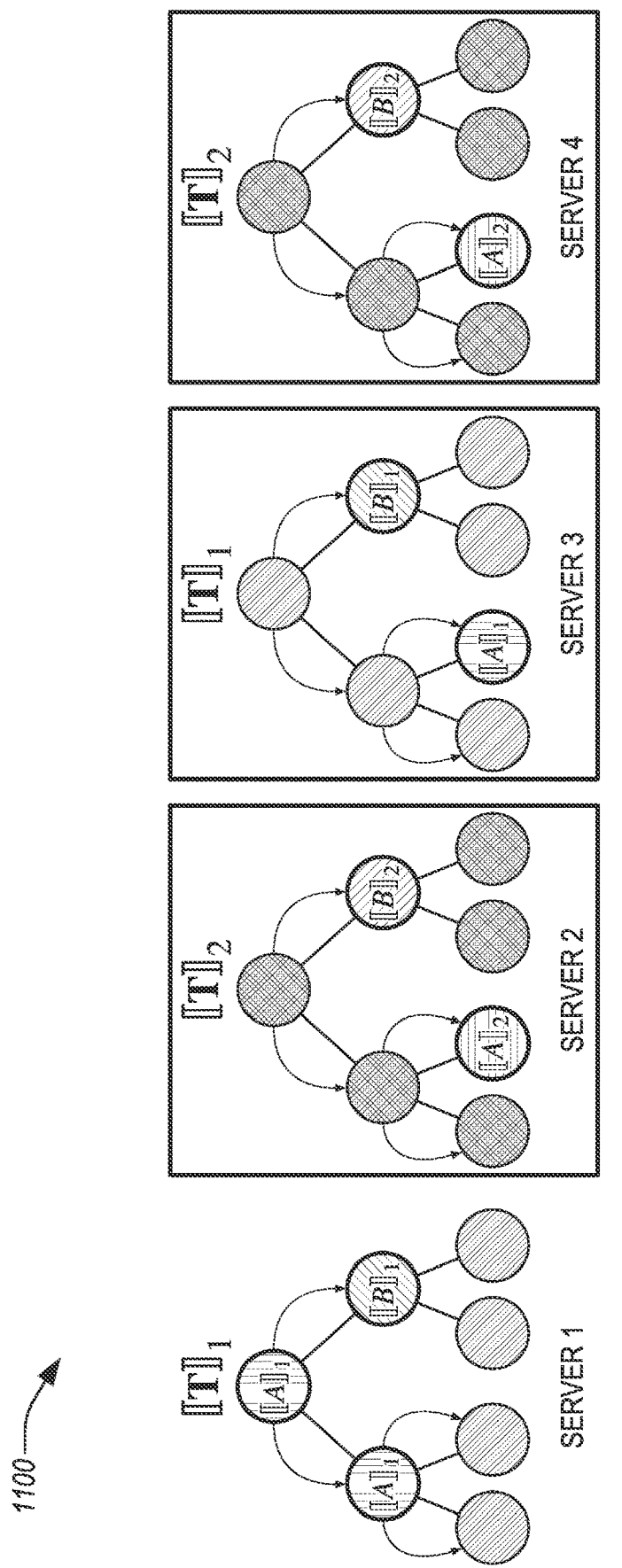
FIG. 11 illustrates an example of a $ORAM_{XOR}^{SS}$ eviction.

FIG. 11 illustrates an example 1100 of a $ORAM_{XOR}^{SS}$ eviction. As shown, triplet eviction is being used, and a matrix product is performed to obliviously push real blocks to deeper levels in the tree. Moreover, all servers can be seen to perform the same operations.

Figure 12:
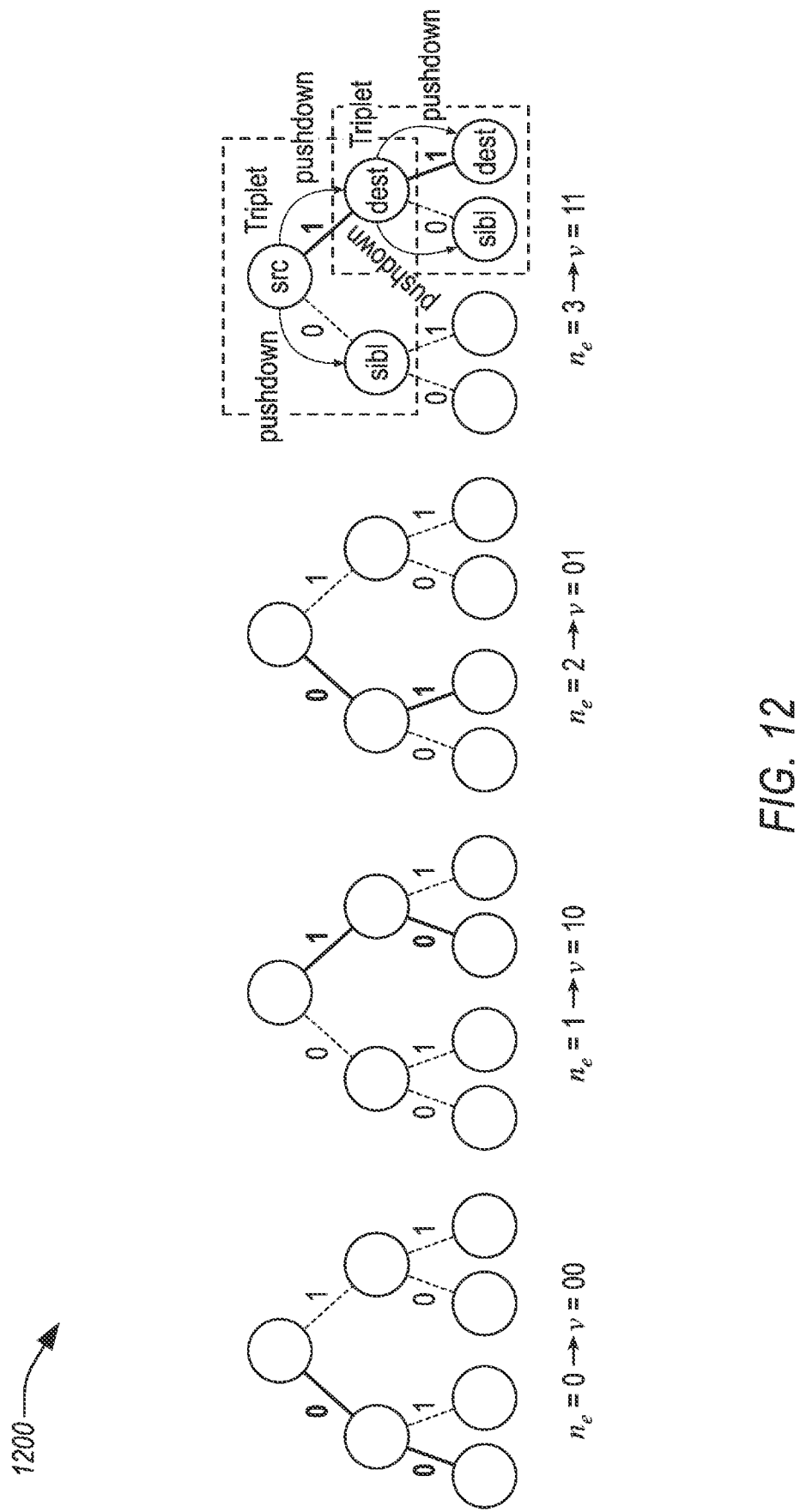
FIG. 12 illustrates an example of a deterministic eviction path for $ORAM_{XOR}^{SS}$.
Figure 13:
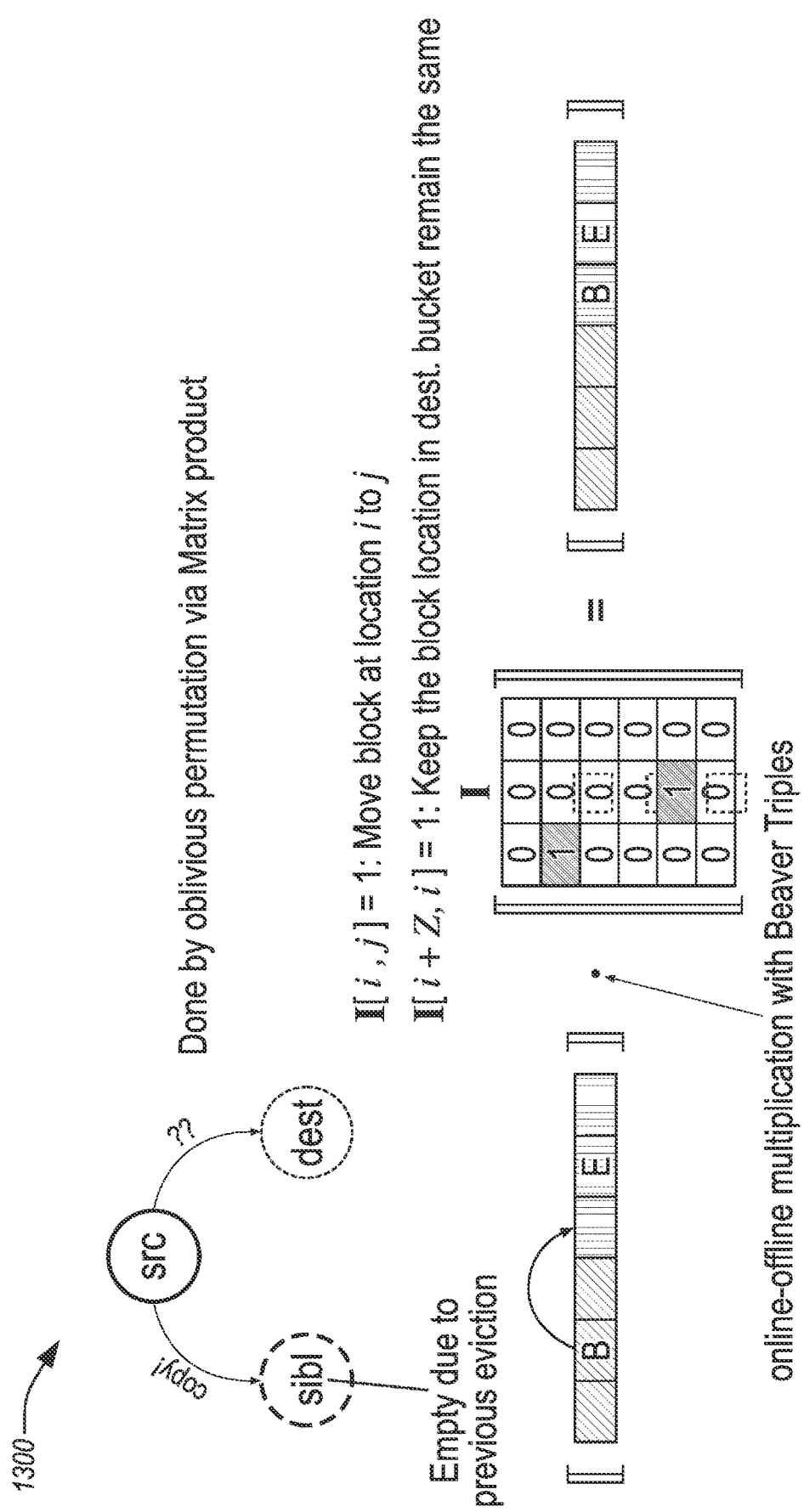
FIG. 13 illustrates an example of further details of $ORAM_{XOR}^{SS}$ triplet eviction.

FIG. 12 illustrates an example 1200 of a deterministic eviction path for $ORAM_{XOR}^{SS}$. As shown, the deterministic eviction path may be performed with a reverse lexicographical order according to the equation v=DigitReverse$_2$($n_e$ mod $2^H$) as shown in the TripletEviction function of FIG. 10, where DigitReverse$_2$ denote the order-reversal of base-2 digits of an integer, and $n_e$ denotes the number of eviction operations so far. FIG. 13 illustrates an example 1300 of further details of $ORAM_{XOR}^{SS}$ triplet eviction.

FIG. 14 illustrates an example 1400 of reducing the number of servers required to perform $ORAM_{XOR}^{SS}$ for a given privacy level. As shown, by adding a third set of tree-ORAM shares, three servers may be utilized instead of four. Notably, in this disclosure Onion-ORAM is used as a blueprint of a specific design to describe $ORAM_{XOR}^{SS}$. However, harnessing XOR-based PIR protocol and secret sharing homomorphic properties can be further applied atop other ORAM design principles such as Tree-ORAM or Circuit-ORAM, each of which can enable a constant client bandwidth blowup in the presence of malicious adversaries. Moreover, while the $ORAM_{XOR}^{SS}$ may be utilized with a three-server approach, $ORAM_{XOR}^{SS}$ can be also extended to work with k servers (k>3) to offer a higher privacy level (i.e., collusion) of XOR-based PIR and secret sharing.

Figure 15:
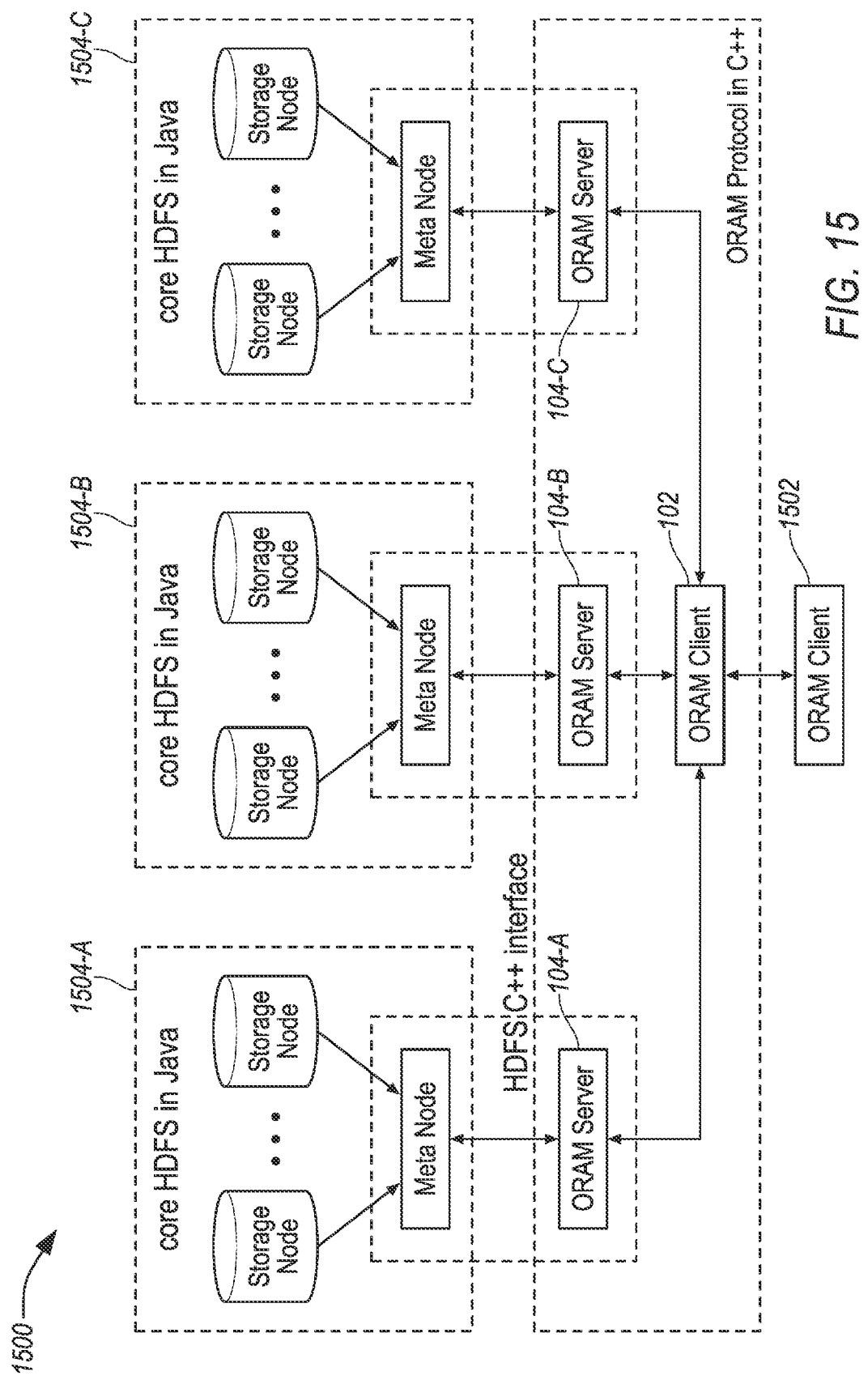
FIG. 15 illustrates an example of incorporation of $ORAM_{XOR}^{SS}$ into a distributed filesystem.

FIG. 15 illustrates an example 1500 of incorporation of $ORAM_{XOR}^{SS}$ into a distributed filesystem. As shown in the illustrated example 1500, $ORAM_{XOR}^{SS}$ is incorporated into the Hadoop Distributed File System (HDFS). HDFS provides desirable distributed filesystem (DFS) properties (e.g., transparency, mobility, performance, scalability, availability, heterogeneity, access control), although it does not provide security services. As further shown, a multi-server ORAM may be integrated into the HDFS. By addition of $ORAM_{XOR}^{SS}$, the filesystem may gain the properties of confidentiality, integrity, and obliviousness.

More specifically, to incorporate $ORAM_{XOR}^{SS}$, a client 1502 desiring to utilize the filesystem may access an ORAM client 102, the client 102 interacting with the ORAM servers 104-A, 104-B, 104-C (collectively 104) as discussed in detail herein. However, as compared to the data stores 106 illustrated in FIG. 1, in the example 1500 each ORAM servers 104 communicates with a respective HDFS instance 1504-A, 1504-B, 1504-C (collectively 1504).

While the system shown in the example 1500 provides a secure distributed filesystem, it does impart a load on the single node interacting with the client 1502. This is because all the ORAM computations (e.g., XOR-PIR, matrix products, etc.) are performed by a single node. Such a setup does not take advantage of multiple nodes in a cluster. Yet, the ORAM operations can be fully parallelizable.

Figure 16:
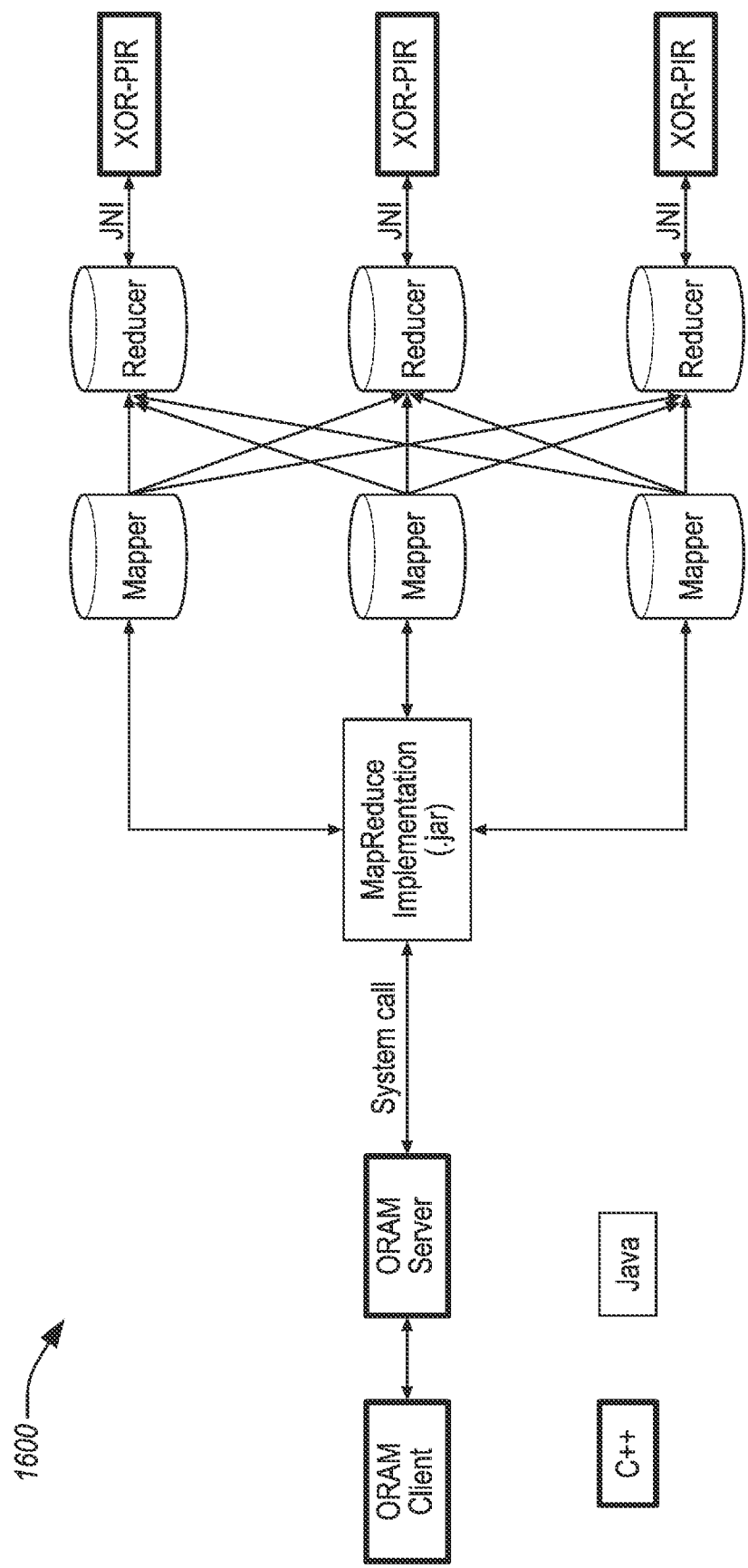
FIG. 16 illustrates an example of incorporation of $ORAM_{XOR}^{SS}$ into a distributed filesystem that uses parallelization.

FIG. 16 illustrates an example 1600 of incorporation of $ORAM_{XOR}^{SS}$ into a distributed filesystem that uses parallelization. As shown, Map-Reduce tasks may be performed in Java, in which Reduce jobs invoke ORAM C++ functions via Java Native Interface (JNI). In this specific example, the ORAM functions may be implemented in C++, where the servers submit Map-Reduce tasks via system call. As shown in the example 1600, ORAM read operations and ORAM eviction operations may be performed using this layout.

Figure 17:
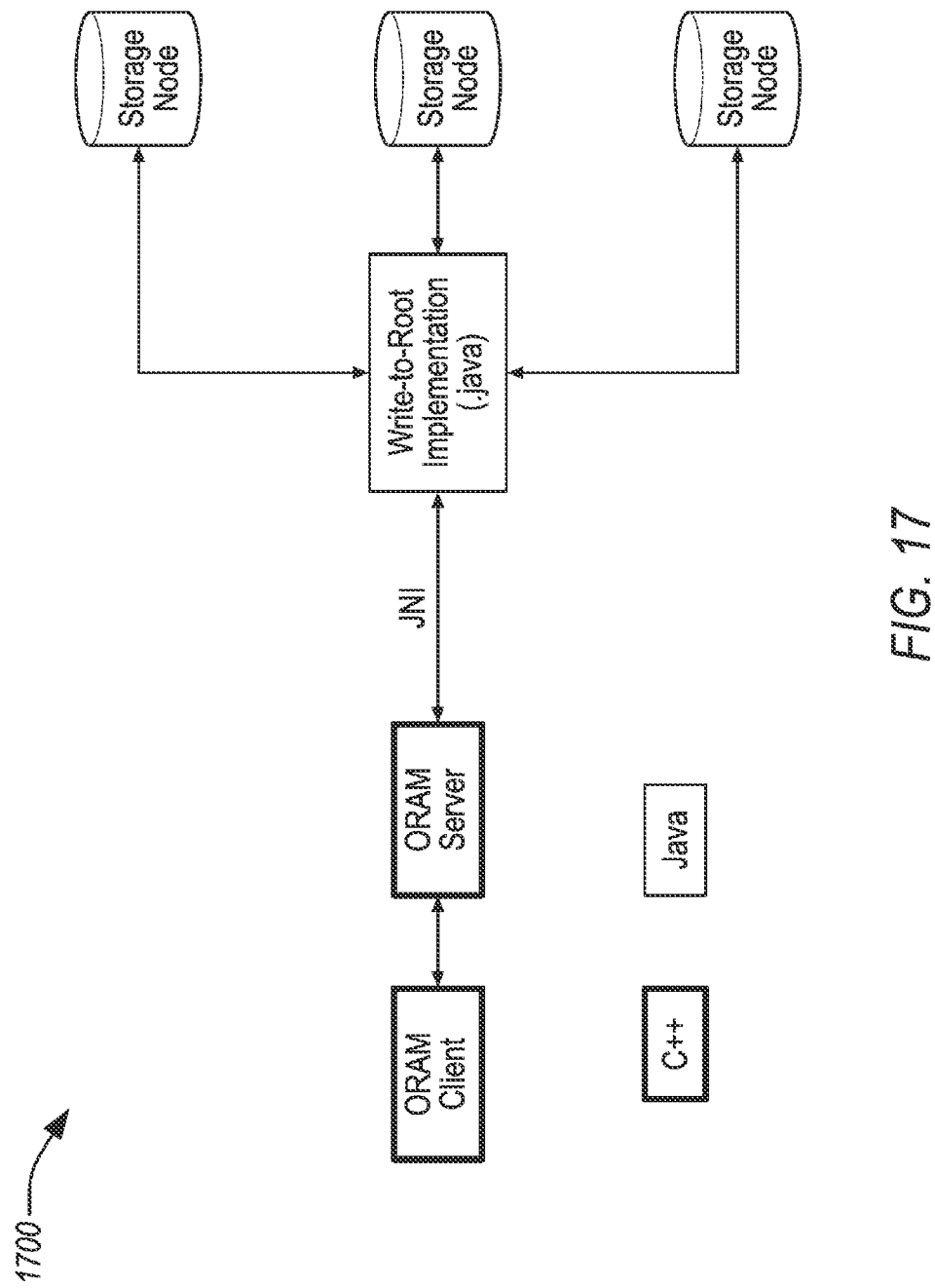
FIG. 17 illustrates another example of incorporation of $ORAM_{XOR}^{SS}$ into a distributed filesystem that uses parallelization.

FIG. 17 illustrates another example 1700 of incorporation of $ORAM_{XOR}^{SS}$ into a distributed filesystem that uses parallelization. As shown, an ORAM Write-to-Root Operation is described. Notably, MapReduce may require a special file format called a SequenceFile. However, the HDFS C++ APIs do not support SequenceFile file format. Accordingly, a Java implementation may instead be used. Additionally, HDFS may not support overwrite mode, but only append mode, in which case the Write-to-Root may follow a sequential order such that an overwrite can be done via append mode.

In sum, a new multi-server ORAM scheme with security against malicious attackers is proposed. The ORAM may be incorporated into an oblivious distributed file system with desirable efficiency and security properties.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for providing an oblivious distributed file system using an oblivious random access machine (ORAM), comprising:
   an ORAM balanced tree structure, where each node in the tree is configured to store data blocks, the structure including at least two shares; and
   at least first, second, and third ORAM servers, each of the servers configured to communicate with a client ORAM device, and programmed to facilitate storage of a different subset of the shares of the tree structure using a distributed file system and to implement an access procedure of a tree-based ORAM using the tree structure, including a retrieval phase and an eviction phase,
   wherein in the retrieval phase, the servers utilize an XOR-based Private Information Retrieval (PIR) protocol to retrieve data blocks as requested from the client ORAM device, and in the eviction phase, the servers utilize a linear secret sharing scheme, such that responsive to a block being retrieved and updated, the servers write the updated value to an empty slot in the root bucket of the structure, and responsive to a predefined number of successive retrievals, the servers perform triplet eviction using a deterministic eviction path following a reverse lexicographical order of the structure.

2. The system of claim 1, wherein the linear secret sharing scheme supports addition and multiplication operations on the at least two shares.

3. The system of claim 1, wherein the linear secret sharing scheme is a replicated linear secret sharing scheme.

4. The system of claim 1, wherein the linear secret sharing scheme offers security in an environment including a malicious adversary.

5. The system of claim 1, wherein the number of shares is exactly three shares $\{[\![T]\!]_0, [\![T]\!]_1, [\![T]\!]_2\}$, the number of ORAM servers is three, and the first, second, and third ORAM servers ($S_0$, $S_1$, $S_2$) are configured to facilitate storage of shares $[\![T]\!]_i$ and $[\![T]\!]_{i+1(\bmod\ 3)}$, where i is the number of the respective ORAM server.

6. The system of claim 5, wherein the servers are further programmed to store an element of data A into a data block Z as two portions $[\![A]\!]_1$, $[\![A]\!]_2$, each portion being stored to a different one of the three shares $\{[\![T]\!]_0, [\![T]\!]_1, [\![T]\!]_2\}$, wherein the portions $[\![A]\!]_1$ and $[\![A]\!]_2$ are summed to retrieve the shared secret A.

7. The system of claim 5, wherein the servers are further programmed to, responsive to completion of evictions, the server $S_i$ performing the eviction sends the share $[\![T]\!]_i$ to server $S_{i-1}$, or if i=0 to the highest numbered server, to maintain consistency between replicas of the shares $\{[\![T]\!]_0, [\![T]\!]_1, [\![T]\!]_2\}$.

8. The system of claim 1 wherein the reverse lexicographical order is defined according to equation $v=\text{DigitReverse}_2(n_e \bmod 2^H)$, where $\text{DigitReverse}_2$ denote the order-reversal of base-2 digits of an integer, and $n_e$ denotes the number of eviction operations so far.

9. The system of claim 1, wherein the distributed filesystem is the Hadoop Distributed File System (HDFS).

10. A method for providing an oblivious distributed file system using an oblivious random access machine (ORAM), comprising:
    maintaining an ORAM balanced tree structure, where each node in the tree is configured to store data blocks, the structure including at least two shares; and
    utilizing at least two ORAM servers, each of the servers communicating with a client ORAM device, the servers facilitating storage of a different subset of the shares of the tree structure using a distributed file system and implementing an access procedure of a tree-based ORAM using the tree structure T including a retrieval phase and an eviction phase,
    wherein in the retrieval phase, utilizing by the servers an XOR-based Private Information Retrieval (PIR) protocol to retrieve data blocks as requested from the client ORAM device, and in the eviction phase, utilizing by the servers a linear secret sharing scheme, such that responsive to a block being retrieved and updated, by the servers writing the updated value to an empty slot in the root bucket of the structure, and responsive to a predefined number of successive retrievals, the servers performing triplet eviction using a deterministic eviction path following a reverse lexicographical order of the structure.

11. The method of claim 10, wherein the linear secret sharing scheme supports addition and multiplication operations on the at least two shares.

12. The method of claim 10, wherein the linear secret sharing scheme is a replicated linear secret sharing scheme.

13. The method of claim 10, wherein the linear secret sharing scheme offers security in an environment including a malicious adversary.

14. The method of claim 10, wherein the number of shares is exactly three shares $\{[\![T]\!]_0, [\![T]\!]_1, [\![T]\!]_2\}$, the number of ORAM servers is three, and the first, second, and third ORAM servers ($S_0$, $S_1$, $S_2$) are configured to facilitate storage of shares $[\![T]\!]_i$ and $[\![T]\!]_{i+1(\bmod\ 3)}$, where i is the number of the respective ORAM server.

15. The method of claim 14, wherein the servers are further programmed to store an element of data A into a data block Z as two portions $[\![A]\!]_1$, $[\![A]\!]_2$, each portion being stored to a different one of the three shares $\{[\![T]\!]_0, [\![T]\!]_1, [\![T]\!]_2\}$, wherein the portions $[\![A]\!]_1$ and $[\![A]\!]_2$ are summed to retrieve the shared secret A.

16. The method of claim 14, further comprising, responsive to completion of the evictions, the server $S_1$ performing the eviction sending the share DI to server $S_{i-1}$, or if i=0 to the highest numbered server, to maintain consistency between replicas of the shares $\{[\![T]\!]_0, [\![T]\!]_1, [\![T]\!]_2\}$.

17. The method of claim 10, wherein the reverse lexicographical order is defined according to equation $v=\text{DigitReverse}_2(n_e \bmod 2^H)$, where $\text{DigitReverse}_2$ denote the order-reversal of base-2 digits of an integer, and $n_e$ denotes the number of eviction operations so far.

18. The method of claim 10, wherein the distributed filesystem is the Hadoop Distributed File System (HDFS).

19. A non-transitory computer-readable medium comprising instructions that, when executed by processors of at least two ORAM servers, each of the servers communicating with a client ORAM device, causes the servers to:
   maintain an ORAM balanced tree structure, where each node in the tree is configured to store data blocks, the structure including at least two shares; and
   facilitate storage of a subset of the shares of the tree structure using a distributed file system and implementing an access procedure of a tree-based ORAM using the tree structure including a retrieval phase and an eviction phase,
   wherein in the retrieval phase, the servers use an XOR-based Private Information Retrieval (PIR) protocol to retrieve data blocks Z as requested from the client ORAM device, and in the eviction phase, the servers use a homomorphic computation of linear secret sharing scheme, such that responsive to a block being retrieved and updated, the servers write the updated value to an empty slot in the root bucket of the structure, and responsive to a predefined number of successive retrievals, the servers perform triplet eviction using a deterministic eviction path following a reverse lexicographical order of the structure.

20. The medium of claim 19, wherein the linear secret sharing scheme supports addition and multiplication operations on the at least two shares.

21. The medium of claim 19, wherein the linear secret sharing scheme is a replicated linear secret sharing scheme.

22. The medium of claim 19, wherein the linear secret sharing scheme offers security in an environment including a malicious adversary.

23. The medium of claim 19, further comprising instructions that, when executed by the servers, causes the servers to store an element of data A into a data block Z as two portions $⟦A⟧_1$, $⟦A⟧_2$ each portion being stored to a different one of the three shares $\{⟦T⟧_0, ⟦T⟧_1, ⟦T⟧_2\}$, wherein the portions $⟦A⟧_1$ and $⟦A⟧_2$ are summed to retrieve the shared secret A.

24. The medium of claim 23, further comprising instructions that, when executed by the servers, causes the servers to, responsive to completion of the evictions, the server $S_1$ performing the eviction sends the share $⟦T⟧_i$ to server $S_{i-1}$, or if i=0 to the highest numbered server, to maintain consistency between replicas of the shares $\{⟦T⟧_0, ⟦T⟧_1, ⟦T⟧_2\}$.

25. The medium of claim 19, wherein the reverse lexicographical order is defined according to equation $v=\text{DigitReverse}_2(n_e \bmod 2^H)$, where $\text{DigitReverse}_2$ denote the order-reversal of base-2 digits of an integer, and $n_e$ denotes the number of eviction operations so far.

26. The medium of claim 19, wherein the distributed filesystem is the Hadoop Distributed File System (HDFS).

* * * * *

UNITED STATES PATENT AND TRADEMARK OFFICE
CERTIFICATE OF CORRECTION

| | | |
|---|---|---|
| PATENT NO. | : 11,290,264 B2 | Page 1 of 1 |
| APPLICATION NO. | : 16/675705 | |
| DATED | : March 29, 2022 | |
| INVENTOR(S) | : Thang Hoang et al. | |

It is certified that error appears in the above-identified patent and that said Letters Patent is hereby corrected as shown below:

In the Claims

Column 14, Lines 64-65, Claim 16:
After "performing the eviction sending the share"
Delete "DI"
Insert -- [[T]] $_i$ --

Signed and Sealed this
Twelfth Day of September, 2023

*Katherine Kelly Vidal*

Katherine Kelly Vidal
*Director of the United States Patent and Trademark Office*